(12) United States Patent
Reus et al.

(10) Patent No.: US 12,022,761 B2
(45) Date of Patent: Jul. 2, 2024

(54) TREATMENT FOR PLANT SEEDS

(71) Applicant: INCOTEC HOLDING B.V., Enkhuizen (NL)

(72) Inventors: Henricus Antonius Maria Reus, Enkhuizen (NL); Jantien Glas, Enkhuizen (NL); Jérôme Sylvain Garnier, Enkhuizen (NL); Pieter Wilhelmus Johannes Samuels, Enkhuizen (NL)

(73) Assignee: Incotec Holding B.V., Enkhuizen (NL)

( * ) Notice: Subject to any disclaimer, the term of this patent is extended or adjusted under 35 U.S.C. 154(b) by 0 days.

(21) Appl. No.: 15/318,897

(22) PCT Filed: Jun. 15, 2015

(86) PCT No.: PCT/EP2015/063338
§ 371 (c)(1),
(2) Date: Dec. 14, 2016

(87) PCT Pub. No.: WO2015/193239
PCT Pub. Date: Dec. 23, 2015

(65) Prior Publication Data
US 2017/0127603 A1    May 11, 2017

(30) Foreign Application Priority Data

Jun. 16, 2014 (EP) .................................. 14172521
Dec. 19, 2014 (WO) ................. PCT/EP2014/078767

(51) Int. Cl.
*A01C 1/06* (2006.01)

(52) U.S. Cl.
CPC .................... *A01C 1/06* (2013.01)

(58) Field of Classification Search
CPC .................... A01C 1/06; A01C 1/00
See application file for complete search history.

(56) References Cited

U.S. PATENT DOCUMENTS

| | | | |
|---|---|---|---|
| 2,986,840 A | 6/1961 | Rogers | |
| 5,281,315 A * | 1/1994 | Krapivina | H05F 3/04 204/164 |
| 5,918,413 A * | 7/1999 | Otani | A01C 1/06 442/166 |
| 6,730,733 B2 * | 5/2004 | Overbeek | C08G 18/0823 522/100 |
| 7,774,978 B2 | 8/2010 | Ding et al. | |
| 2002/0134012 A1 | 9/2002 | Ding et al. | |
| 2003/0055171 A1 | 3/2003 | Overbeek et al. | |
| 2004/0118040 A1 * | 6/2004 | Asrar | A01C 1/06 47/57.6 |
| 2005/0197251 A1 | 9/2005 | Ding et al. | |
| 2007/0207927 A1 * | 9/2007 | Rosa | A01C 1/06 504/100 |
| 2007/0298965 A1 * | 12/2007 | Schneider | A01N 37/52 514/772.3 |
| 2008/0004178 A1 | 1/2008 | Ding et al. | |
| 2013/0053244 A1 * | 2/2013 | Devisetty | A01N 43/90 504/136 |

FOREIGN PATENT DOCUMENTS

| | | |
|---|---|---|
| CN | 1498075 A | 5/2004 |
| DE | 112004000203 T5 | 6/2006 |
| EA | 200601454 A1 | 2/2007 |
| EP | 2175709 B1 | 6/2013 |
| GB | 2443011 A | 4/2008 |
| JP | 2004242582 A1 | 9/2004 |
| RU | 2010109451 A | 9/2011 |
| RU | 2517857 C2 | 6/2014 |
| WO | 0078124 A1 | 12/2000 |
| WO | 2000078124 A1 | 12/2000 |
| WO | 2010086303 A2 | 8/2010 |
| WO | 2010107312 A1 | 9/2010 |
| WO | 2014079932 A1 | 5/2014 |

OTHER PUBLICATIONS

Bedane et al. (Development and evaluation of a guayule seed processing system, Industrial Crops and Products 31 (2010) pp. 378-384) (Year: 2009).*

Racheva et al. (Conversion of polyolefin wax to carbon adsorbents by thermooxidation treatment, Bulgarian Chemical Communications, vol. 46, Special Issue A, p. 129-133, 2014) (Year: 2014).*

(Continued)

*Primary Examiner* — Johann R Richter
*Assistant Examiner* — Danielle Johnson
(74) *Attorney, Agent, or Firm* — Buchanan Ingersoll & Rooney PC

(57) ABSTRACT

The invention relates to a method for coating plant seed, to a seed coating composition, to a coated plant seed, to a use of one or more water-insoluble polymers with a $T_g$ of at least 35° C., to a method of preparing a seed coating composition, to a method of preparing coated seed, to coated seed, to a use of an abrasive material primer or plasma, and to an apparatus for coating of seed.

The method for coating plant seed comprises applying to the seed a seed coating composition comprising one or more water-insoluble polymers with a $T_g$ of at least 35° C.

6 Claims, 6 Drawing Sheets

(56) References Cited

OTHER PUBLICATIONS

Nakagami et al. (Application of Aqueous suspensions and Latex Dispersions of Water-Insoluble Polymers for Tablet and Granule Coatings, Chem. Pharm. Bull. 39(7) 1837-1842 (1991) (Year: 1991).*

International Search Report and Written Opinion for International Application No. PCT/EP2015/063338, dated Nov. 3, 2015, 18 Pages.

Russian Office Action for Russian Application No. 2017101067, dated Jun. 9, 2018 with translation, 4 pages.

* cited by examiner (a)  (b)

TREATMENT FOR PLANT SEEDS

CROSS REFERENCE TO RELATED APPLICATIONS

This application is the National Stage filing of International Appln. No. PCT/EP2015/063338, filed 15 Jun. 2015, and claims priority of European Patent Application No. 14172521.8, filed 16 Jun. 2014, and PCT/EP2014/078767, filed 19 Dec. 2014, the entirety of which applications are incorporated herein by reference for all purposes.

The invention relates to a method for coating plant seed, to a seed coating composition, to a coated plant seed, to a use of one or more water-insoluble polymers with a $T_g$ of at least 35° C., to a method of preparing a seed coating composition, to a method of preparing coated seed, to coated seed, to a use of an abrasive material primer or plasma, and to an apparatus for coating of seed.

Plant seed is often coated before sowing, for example to protect seeds from damage during handling and to improve handling properties. Seed coating can also improve visual recognition of various batches of seed and allow for better tracking of seed batches, especially during the sowing process in the field. Seeds are often coated to provide useful substances (active ingredients) to the seed and to the seedlings upon germination, for example plant nutrients, growth stimulating agents, and plant protection products. An important advantage of providing active ingredients in a seed coating is that it allows for a precise and controlled release and dose per seedling. Typical seed coating method include film coating, pelleting and encrusting of seed.

Coated seed is typically subject to contact with other objects and surfaces and also to contact between the coated seeds. This may result in wear of the coated seeds. Contact with another object or surface may also result in rubbing-off. Rubbing-off refers to transfer of parts of the coating from the coated seed to a surface of another object not being (coated) seed, such as containers and seed handling equipment. Rubbing-off may result in loss of active material and in contamination. In case of coated seed planted or sown by hand, rubbing-off may give rise to health and safety concerns. Moreover, seeds coatings exhibiting rubbing-off tend to be sticky, increasing risk of imprecise planting and of blocking of seed-handling equipment. Rubbing-off can already be caused by a single contact with another surface. Rubbing-off in particular includes transfer of parts of coatings which are at least partly based on non-water liquids with a boiling point (e.g. above 100° C.), in particular of coatings which are not completely dried through.

Another effect is that the coated seed can become uneven, for instance due to wear. Wear generally relates to any change in the coating of a coated seed due displacement of at least some coating material upon contact with another coated seed, or another object or surface, typically due to a large number of impacting of other objects on the coating. Wear may involve movement of coating material over the surface of the seed, without release from the single coated seed (sliding). Wear may involve repositioning of coating material on the seed, for instance into notches. This can result in an uneven distribution. It may also involve release of coating material from the coated seed, for instance by transfer of coating material to objects other than coated seed. Wear can further involve release of fragments of coating material, for instance as dust (dusting). Such dust off may involve loss of fine dry coating particles. Furthermore, coating material may be transferred between coated seeds. Sliding and transfer between coated seed results in redistribution of coating material on the coated seed, for instance without loss of coating material (without loss due to dusting and/or transfer to other objects). This may be referred to as coating material redistribution or non-loss wear. The seed coating has preferably high resistance to all these processes. Accordingly, high wear resistance is desirably. Wear resistance indicates the degree to which the coating is affected by displacement of coating material, in particular fragments of the coating, upon contact with other objects and contact between the coated seeds. High coating strength and good adhesion to the seed surface are properties which can contribute to good wear resistance. Good wear resistance is in particular challenging for seed with smooth surfaces, such as corn seed. Low wear resistance is associated with damage of the coating, for instance during seed handling and planting, may result in an unattractive appearance and may give the impression of loss of active ingredient due to uneven distribution of coating material on a seed. Low wear resistance increases the risk of dusting of the coating and of contamination of equipment and environment.

The increasing use of liquid based formulations of plant enhancing agents causes demand for improved compatibility of seed coating compositions with such formulation. Typical liquid based formulations include emulsions and suspensions of the plant enhancing agent (active ingredient). Such formulations typically comprise as dispersant phase a compound which is liquid at 20° C. These formulations often result in inferior coating properties, such as severe rubbing-off and low wear resistance for conventional seed coatings. This is especially problematic for corn seed and other smooth seed.

An example of a liquid based formulation for which severe rubbing-off and low wear resistance is obtained with conventional seed coatings is the CMR cocktail (thiamethoxam, available as Cruiser®, metalaxyl-M and fludioxonil, available as Maxim®, and tebuconazole, available as Raxil®). Another example is an emulsion based formulation comprising cypermethrin, and ethylene glycol, available as Langis® from Chemtura. Film coating of seed with Langis® and conventionally used binders typically results in seed coating which do not completely dry. For instance, Langis® is often combined with one or more other plant protection products (PPPs) to obtain a PPP cocktail, which PPP cocktail is then combined with a coating formulation comprising a polymeric binder into a slurry. When the slurry is applied to plant seed, the coated seed remain wet and sticky and the coating is easily rubbed-off, even by simple contact of coated seed with hands, gloves or containers. Coated seed may be not completely dry even months after coating.

It is furthermore desired that coating formulations can be easily adjusted to different plant enhancing agent formulations, in particular liquid based formulations, and have broad compatibility with such formulations.

Moreover, volatile organic solvents are desirably avoided in coating formulations as well as in plant enhancing agent formulations. Seed coating compositions are preferably water borne and/or have preferably a low concentration of volatile organic components. Plant enhancing agents are sometimes formulated as dispersions, in particular using a co-solvent such as ethylene glycol or polyethylene glycol (PEG).

U.S. Pat. No. 2,986,840 describes a urea-aldehyde resinous material that can be mixed with seed. It mentions that in the treatment of corn or delinted cotton seed which present a smooth surface, it is necessary that a resinous compound be utilised to adhere the materials to the seed. A disadvantage of this approach is that the choice of coating materials is limited and that processing of tacky resinous compounds is complicated.

Presently, the problem of rubbing-off and/or low wear resistance of coated seeds is mostly addressed through adjusting the formulation of the coating material to increase the stick ability of the coating composition. Disadvantages of this approach include that the choice of coating materials is restricted and that tacky resins are more difficult to handle and process. For ease of processing and planting, it is important that coated seeds to not stick against each other or on the equipment.

JP-A-2004 242 582 describes a germination improvement method involving projecting abrasive particles on seed and grinding of the seed coat, in order to improve water and air permeability of the seed coat. Numerous crops are mentioned, including sweet corn. Numerous optional steps are mentioned including film coating. In example 9, onion seed is treated with abrasive particles and thereafter film coated. WO-A-2014/079932 is directed to a seed treatment composition comprising a waterborne resin and a water dispersible plant protein. This document mentions that opposing properties can be incorporated in the coating by using a multi-phase resin. This document mentions that a phase with higher $T_g$ (e.g. for hardness) may be combined with a lower $T_g$ phase (e.g. for adhesion and/or barrier properties). WO-A-2010/107312 includes an example wherein 1.183 g of a seed coating composition containing 70 wt. % of inorganic particles, 10 wt. % of polyvinyl acetate, 2 wt. % polyvinyl alcohol and 18 wt. % of water was applied together with a PPP cocktail to 1000 g of soybeans.

A general consideration for film coatings, such as based on latex formulations, is that the coating is applied at a temperature above $T_g$ and/or the minimum film forming temperature of the polymeric binder used. Accordingly, a common restraint for selection of the binder is that it has a minimum film forming temperature and/or $T_g$ lower than the expected minimum application temperature. Polymers binders with $T_g$ above 30° C. do generally not form a film at 25° C. because of the hard state of the polymer particles that prevents their coalescence into a coherent film. Coating at high temperatures is not desirable as this can affect seed quality and germination properties. Therefore, hitherto, binders used in the seed coating industry generally have $T_g$ lower than the room temperature or slightly above room temperature to be able to form a film. The present invention is not so restricted.

WO-A-2010/086303 mentions a method of treating seeds with at least one sticker comprising at least one co-monomer chosen from the group of acrylic acid, methacrylic acid or acrylamide, and at least two other co-monomers, wherein the $T_g$ of the sticker is from −30° C. to 30° C. DE-11 2004 000 203 relates to a method involving applying glue to a seed and thereafter pelleting with a kind of humus. WO-A-00/78124 relates to plasma-deposition of a film on seed. The film is deposited from a gaseous precursor. Prior to the plasma-assisted deposition of a coating, plasma cleaning can be carried out. GB-A-2 443 011 relates to a method comprising placing seed in a cylindrical drum with an outer wall of an abrasive material, followed by application of a coating. None of these three documents is directed to improving wear resistance of film coatings applied as liquid coating compositions.

US-A-2002/0 134 012 relates to a method of controlling the release rate of an agricultural active ingredient from a treated seed, the method comprising applying to seed treated with the ingredient a film comprising an emulsion of a polymer in a liquid in which both the agricultural active ingredient and the polymer have low levels of solubility and non-migrating surfactant; and curing the film, wherein the water insoluble polymer and the surfactant and the relative amounts of each are selected so that the polymer coating that is formed from the polymer and the surfactant has a glass transition temperature within the range of from about −5° C. to about 75° C. This document does not disclose $T_g$ of the polymer.

Styrene-acrylic binders and other acrylic binders are commercially available with a wide range for $T_g$. For instance, Encor® 8146 is a styrene acrylic binder with $T_g$ 90° C., Encor® 8155 is a styrene acrylic binder with a $T_g$ of −37° C., both are available from Arkema.

An object of the invention is to provide a method that addresses the above-mentioned problems at least in part. The inventors found that this objective can be met by subjecting the seed to a surface treatment before the coating is applied.

Accordingly, the invention relates in a first aspect to a method of preparing coated seed, comprising subjecting seed to a surface treatment, and applying a coating layer onto the treated surface of the seed, wherein said coating layer preferably comprises one or more selected from the group consisting of a film coating layer, a pelleting layer and an encrusting layer. Preferably, the method is a method of improving the wear resistance of coated seed. In particular, the coating layer can be applied by film coating as liquid coating composition comprising a polymeric binder.

Advantages of the method include that it allows for a flexible choice of the coating material, is simple to carry out and can easily be integrated into existing seed coating processes. In contrast to the prior art, the present invention is not based on using coatings with particular formulations. Therefore, the invention provides a new and flexible approach to the problem of rubbing-off of coated seed and improving wear resistance. In addition, the method allows for improved visual appearance of the coating, also when the coated seeds have been subjected to wear and abrasion.

DETAILED DESCRIPTION

Figure 1:
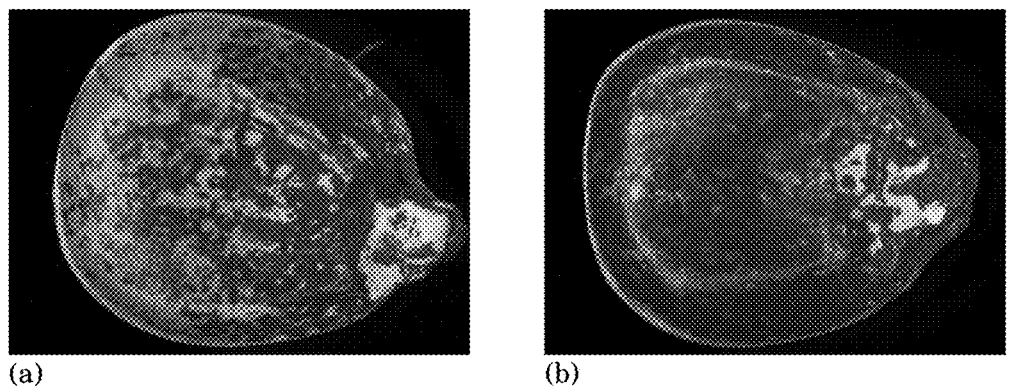
FIG. 1a and FIG. 1b shows a comparative coated corn seed that was not sanded and a corn seed prepared in accordance with an embodiment of the present invention, respectively.

The term "seed" as used herein refers in particular to the ripened ovule of gymnosperms and angiosperms, which contains an embryo surrounded by a protective cover. In particular, the term covers cereal kernels. The protective cover can comprise the seed coat (testa). Some seeds comprise a pericarp or fruit coat around the seed coat. In particular when this layer is closely adhered to the seed, as in cereal kernels, it is in some cases referred to as a caryopsis or an achene. As used herein, the term "seed coat" includes a caryopsis or an achene. In practical terms, the term "seed" includes but is not restricted to anything that can be planted in agriculture to produce plants, including pelleted seeds, true seeds, plant seedlings, rootstock, plant cuttings and plant parts such as a tuber or bulb.

The term "surface treatment" as herein refers in particular to a selective modification of the outer surface of the seed, on which a coating can be applied, typically without substantially modifying inner parts of the seed.

The term "coating" as used herein refers broadly to applying material to a surface of a seed, for instance as a layer of a material around a seed. Coating includes film coating, pelleting, and encrusting. Pellets obtained with pelleting are also known as seed pills. The coating is preferably applied over substantially the entire surface of the seed, such as over 90% or more of the surface area of the seed, to form a layer. However, the coating may be complete or partial, for instance over more than 20%, or more than 50% of the surface area of the seed.

The glass transition temperature ($T_g$) is known for many polymers and can if necessary be determined according to for instance ASTM E1356-08 (2014) "Standard Test Method for Assignment of the Glass Transition Temperatures by Differential Scanning calorimetry". For instance by DSC with drying at 110° C. for one hour to eliminate effect of water and/or solvent, DSC sample size of 10-15 mg, from −100° C. to 100° C. at 20° C./min under $N_2$, with $T_g$ defined as midpoint of the transition region. Minimum film forming temperature (MFFT) can be measured for instance according to ASTM D2354-10e1.

The term "polymeric binder" refers to the function of a polymeric component in the coated seed. Before application of the polymeric binder on the seed, the polymeric binder in some embodiments does not function as binder. A polymeric binder is typically film-forming. Film coating typically refers to film forming by the polymeric binder, typically upon evaporation of solvent after application of the polymeric binder on seed. Polymeric binder includes homopolymers and copolymers and includes natural and synthetic polymers.

The term "seed coating composition" refers to a composition to be used for coating of seed, possibly after combination of the composition with other compositions, such as PPP formulations and/or diluents such as water. Hence, the term includes as well as coating formulation which are not yet mixed with PPP formulations and/or not yet applied as coating.

The term "plant enhancing agent" includes any component that is directly or indirectly advantageous for a plant or a plant seed, for instance through a biological effect on the plant, seed, or on harmful organisms such as fungi, pests and insects, including PPPs (plant protective products), safeners, growth promoters, growth regulators.

For any aspect of the invention, the plant seed is for example seed of an agricultural crop, vegetable seed, herb seed, wildflower seed, ornamental seed, grass seed and tree and bush seeds.

Preferably, the plant seed is of an agricultural crop. The seed may be of the order of Monocotyledoneae or Dicotyledoneae. Suitable seed include seed of soybean, cotton, corn, peanut, maize, wheat, barley, oat, rye, triticale, mustard, sunflower, sugar beet, safflower, millet, chicory, flax, rapeseed, buckwheat, tobacco, hemp seed, alfalfa, signal grass, clover, sorghum, chick pea, beans, peas, and vetch. Examples of suitable vegetable seeds include asparagus, chives, celery, leek, garlic, beetroot, spinach, beet, curly kale, cauliflower, sprouting broccoli, savoy cabbage, white cabbage, red cabbage, kohlrabi, Chinese cabbage, turnip, endive, chicory, water melon, melon, cucumber, gherkin, marrow, parsley, fennel, pea, beans, radish, black salsify, eggplant, sweet corn, pop corn, carrot, onion, tomato, pepper, lettuce, snap bean, cucurbit, shallot, broccoli, *Brassica*, and Brussels sprout.

The problem of rubbing-off is especially important for seed with a smooth surface. The methods of the invention are therefore especially useful for such seed, in particular for corn (*Zea mays* subsp. *Mays*) and flax, beans, asparagus, peas, okra, sunflowers, and *Brassica*. Preferably, the seed is corn seed. Preferably, the corn seed is of a field corn variety. Preferably, the seed is selected from dent corn, flint corn, flour corn, blue corn and/or waxy corn, for example *Zea mays amylacea, Zea mays* var. *indentata, Zea mays indurata*. Other suitable varieties of corn include the varieties Baby, Quality Protein Maize, and genetically modified maize, for example varieties MON 810 and MON 863.

The method is directed to reducing or preventing rubbing-off of coated seeds and hence to a method for the preparation of coated seeds with advantageous low rubbing-off properties. The method comprises a step of subjecting plant seed to a surface treatment.

Preferably, the plant seed is capable of germinating. Optionally, the seed may be deprived of husk (so-called husked seed or de-hulled seed). The seed may be primed or not primed (having been subjected to a treatment to improve the germination rate, e.g. osmopriming, hydropriming, matrix priming). Preferably, the seed is not yet provided with artificial layers prior to surface treatment, for example layers comprising a binder, for example a polymer. Accordingly, the coating layer is preferably applied directly on the natural outer surface of the seed as it is modified by the surface treatment, in particular on the seed coat as treated. For the preferred surface treatment comprising increasing the surface roughness of the surface of the seed, preferably at least part of the coating layer is applied directly on the seed coat.

The surface treatment typically comprises causing chemical and/or physical changes of at least part of the surface of part of the seed. Preferably, the surface treatment comprises increasing the surface roughness of the seed. Preferably, increasing the surface roughness of the seed comprises selective removal of parts of the seed coat, selective deformation of the seed coat, or a combination thereof. Typically, it involves introducing micro roughness on the seed surface. Preferably, the seed coat is partly removed over a part of the surface of the seed and over a fraction of the thickness of the seed coat. Preferably, the surface treatment comprises removing and/or deforming part of the seed coat to form grooves and ridges in the surface of the seed coat.

Preferably, the treatment comprises increasing the surface roughness of the seed such that the value of the surface roughness ($R_a$ value) after treatment is more than or equal to 1.5 times the initial value, more preferably more than 2 times, or more than 5 times the initial value. The surface roughness Ra (arithmetic average of absolute values of the profile) can be measured according to ISO 4287 (definition) and ISO 4288 (measurement method). A suitable measuring method is focus variation technology, as described in ISO 25178, part 606. The operating principle is based on micro-scope optics with limited depth of field and a camera. By scanning in vertical direction several images with different focus are gathered. This data is then used to calculate a surface data set for roughness measurement. A suitable apparatus is InfiniteFocus from Alicona. Confocal laser scanning microscopy and contact surface profilometry can also be used.

In case of corn seed, preferably the surface treatment comprises removing part of the cuticle, and/or the wax layer. A typical cuticle comprises an insoluble cuticular membrane impregnated by and covered with soluble waxes. Cutin, a polyester polymer composed of inter-esterified omega hydroxy acids which are cross-linked by ester and epoxide bonds, is the best-known structural component of the cuticular membrane. The cuticle may also comprise a non-saponifiable hydrocarbon polymer known as Cutan. The cuticular membrane is impregnated with cuticular waxes and covered with epicuticular waxes as wax layer, which waxes are mixtures of hydrophobic aliphatic compounds, hydrocarbons with chain lengths typically in the range of $C_{16}$-$C_{36}$.

A more thorough surface treatment that is preferred comprises removing part of the pericarp, in particular the epicarp. Preferably, the surface treatment leaves a layer of the pericarp essentially intact, in particular the mesocarp. Leaving this layer intact provides as advantage that harmful exposure of the seed to phytotoxic plant protective agents is reduced or prevented.

Without wishing to be bound by way of theory, increasing the surface roughness of the seed is believed to provide improved interfacial adhesion of the coating layers at least in part by virtue of the increase of surface area, for example allowing for Van der Waals interactions, and by virtue of the mechanical interlocking of a formed solid cured coating in the scratches and grooves. For this reason, the coating material is preferably applied as a resin that wets the surface and penetrates into the pores, holes and crevices and other irregularities of the treated seed surface. In addition, removing the outermost layer of the seed partly is believed to result in exposure of inner layers, that may have increased natural micro roughness (based on the cellular structure of these layers) and can result in exposure of more reactive groups. This latter aspect may contribute to the formation of more chemical bonds between the coating material and the seed surface.

Preferably, increasing the surface roughness of the seed comprises abrasion of the seed. Preferably, the abrasion of the seed comprises chemical/and or physical abrasion, more preferably only physical abrasion.

Preferably, abrasion of the seed comprises contacting the seed with abrasive material. Suitable abrasive materials include chemical and physical abrasive materials. An option is chemical abrasion, such as with an etching solution. Another option is surface treatment comprising degreasing, such as contacting with a degreasing solution, for example an organic solvent, for example a primary alcohol, such as a straight-chain primary alcohol, in particular ethanol. Physical abrasive material is however preferred. Physical abrasive materials refer to materials that cause physical abrasion rather than chemical abrasion. Preferably, the abrasive material comprises abrasive particles. Preferably, the abrasive particles are chemically inert. Preferably, the abrasive particles have a hardness value higher than the hardness of the seed coat of the seed to be treated. Accordingly, the abrasive particles are capable of forming scratches in the seed coat.

Preferably, the method comprises contacting the seed and the abrasive material while they are in relative movement to each other. Preferably the seed is moved while in contact with stationary abrasive material, optionally the abrasive material is moved while the seeds are stationary, or both the seeds and the abrasive material are moved. An abrasion machine as is well known in the art can also be used for abrasion. Preferably, the method comprises moving the seed and/or the abrasive material while they are in contact with each other. For example, seed can be tumbled in a chamber comprising abrasive material. Preferably, the method comprises such actions of the abrasive material on the seed as grinding, sanding and buffing. Typically, the surface treatment comprises removing material from the seed surface using a multitude of small abrasive particles.

Suitably, the abrasive material is the form of a granular material or powder. Preferably, the abrasive particles have an average particle size (for example D50, based on volume, in particular equivalent volume spherical diameter, for example as measured with laser diffraction) of 30 to 750 μm, more preferably 50 to 300 μm.

Suitably, the abrasive material comprises abrasive particles immobilised on a support, for example bonded to a backing. In this case, the grit size is preferably 10 μm to 500 μm, more preferably 75 μm to 300 μm, where the size is of the particles of abrading materials, for example as embedded in the backing of the abrasive material. For example, the grit size can be P40 to P1500 (ISO 6344), P60 to P150 (75 μm to 300 μm). For example, the abrasive material can be sanding paper, in particular P60 to P240 sanding paper (ISO 6344).

Suitably, the abrasive material is bonded to a mechanical part of an apparatus wherein said seed is treated in the process. Preferably, a mechanical part comprising bonded abrasive material is connected to an actuator for moving the bonded abrasive material with the mechanical part. Preferably, the method comprises moving the mechanical part comprising bonded abrasive material and/or moving the seed in contact with abrasive material bonded on the mechanical part. For example, the abrasive material can be bonded to a part of a rotary coater for seed coating. Herein, bonding of abrasive material broadly refers to any kind of direct or indirect attachment of abrasive material to a mechanical part. Typically, abrasive particles are (semi) permanent bonded to a carrier and the carrier is releasable attached to mechanical parts of seed treatment apparatus. Optionally, the abrasive material is in the form of a free-flowing powder.

Another option is providing the abrasive material within a fluid carrier, for example a liquid or gas stream, for example abrasive blasting. Abrasive blasting suitably comprises forcibly propelling a stream of abrasive material against a surface under high pressure. A pressurised fluid, typically air, or a centrifugal wheel may be used to propel the blasting material. The abrasive material optionally comprises one or more selected from the group consisting of aluminium oxide, silica, sand, silicon carbide, metals.

Another preferred surface treatment is plasma surface treatment. Accordingly, the method preferably comprises exposing the seed to a plasma before applying a coating layer. Plasma treatment can result in chemical and/or physical changes of the surface of the seed. An optional effect of the surface plasma treatment can be an increase of the surface roughness of the surface of the seed. The plasma treatment can be used alone or in combination with one or more of the mentioned other surface treatments, in particular abrasion.

Preferably, the plasma treatment results in creating chemically active functional groups, such as amine, carbonyl, hydroxyl and carboxyl groups on the surface of the seed. The plasma treatment may result in plasma enhanced chemical vapour deposition. This advantageously improves interfacial adhesion.

The plasma comprises a partially or wholly ionised gas. Typically, the plasma comprises a roughly equal number of positively and negatively charged particles. Preferably the plasma is low temperature plasma. The temperature of the gas in the plasma is preferably below 250° C., more preferably below 150° C., such that the seed is not damaged. Some low temperature plasma have a reduced pressure, such as 5 Pa to 500 Pa, more preferably 10 Pa to 250 Pa. Preferably, the plasma is an atmospheric pressure plasma, for example 0.5 to 5 bar, typically about 1 bar. More preferably, the plasma is based on direct current excitation (for example electric arc) or alternating current excitation (for example, corona discharge, dielectric barrier discharge and plasma jets). A suitable type of plasma includes a surface dielectric-barrier discharge plasma (DBD). In the case of surface DBD, the electrode structure of the plasma source comprises two electrodes arranged on opposite sides of a dielectric. Coplanar surface DBD is a special case of surface DBD in which metallic parts of electrodes are embedded in a dielectric and are not in direct contact with plasma, thus resulting in a longer lifetime of the electrodes. Surface DBD plasma sources can generate a stable atmospheric pressure plasma in nearly any gas mixture. Surface DBD plasma sources are very suitable for the treatment of surfaces. The reason for this is that in surface DBD plasma sources the plasma channels are parallel with a substrate and plasma is thus in a good contact with the surface of the seed.

Another preferred type of plasma includes a plasma jet. In a plasma jet, a pulsed electric arc is generated in a discharge section by means of a high-voltage discharge (typically 5 to 15 kV, 10 to 100 kHz). A process gas, for example oil-free compressed air, flows past the discharge section and is excited and converted to the plasma state. This plasma then passes through a jet head to arrive on the surface of the material to be treated. The jet head is normally at earth potential and in this way largely holds back potential-carrying parts of the plasma stream. A plasma jet is particularly suitable for surface treatment of three-dimensional and non-flat substrates, such as seed. A microwave plasma sources is also particularly suitable for treating three-dimensional and/or non-flat substrates and hence also preferred.

The method may comprise generating a corona discharge plasma by the application of high voltage to sharp electrode tips which forms plasma at the ends of the sharp tips. A linear array of electrodes can be used to create a curtain of corona plasma. Corona discharge equipment used in the method or apparatus may comprise a high-frequency power generator, a high-voltage transformer, a stationary electrode, and grounded carrier for the seed. The method may comprise converting standard utility electrical power into higher frequency power which is then supplied to a treating station where the power is applied through electrodes of for example ceramic or metal over an air gap onto the seed surface.

Another preferable plasma treatment method comprises blown ion plasma treatment. In blown ion plasma treatment, pressurised air is passed in a discharge chamber of a treater head over a single electrode which discharges into the discharge chamber. The electrode energises electrons which, through bombardment, create positively charged ions within the discharge chamber. The air pressure forces the ions to accelerate and stream through an outlet of the discharge chamber out of a tip of the treated head at high velocity toward the seed surface. Blown ion treatment is effective with both conductive and non-conductive surfaces The plasma may comprise air plasma, and may comprise nitrogen, oxygen, carbon dioxide and carbon monoxide, and hydrogen helium, argon or other noble gas, and mixtures thereof. The plasma may also comprise hydrocarbon (e.g. methane), preferably hydrocarbons with 1-4 carbon atoms. Preferably, the plasma is of a compound which is gaseous at 20° C. Preferably the plasma treatment does not result in deposition of layers. The exposure time is typically 10 seconds or less, such as 1 second or less, per seed. Typically, the method comprises ending the plasma treatment prior to applying a film coating, and thereafter applying a film coating. Typically, seed is not exposed to plasma during applying a film coating.

Another preferred surface treatment comprises applying a primer layer. This can be combined with prior abrasion and/or plasma treatment. A primer layer can be used to change the surface unto which the coating layer is applied. The primer layer may have a thickness of 20 µm or less and may comprise for example silicone. Such layer is different from physiological seed priming that is used to break dormancy and control germination.

Preferably, the method comprises applying a primer formulation to the seed. Preferably, the method comprises applying the primer formulation and subsequent applying a coating composition comprising active ingredients such as plant enhancing agent. Alternatively, the primer formulation and the coating composition can be applied simultaneously. More preferably, the coating composition is applied 5 seconds to 10 minutes after the primer, even more preferably 5-120 seconds, most preferably 10-30 seconds.

Preferably, the primer formulation comprises 10-80 wt. % binder, more preferably 20-50 wt. %, based on dry weight. Preferably, the formulation comprises as binder styrene acrylic, ethylene acrylic and/or acrylic. Preferably, the primer formulation comprises 10-80 wt. % particulate material. The particulate material allows the coating to have a rough exposed surface, which improves adherence of the second layer. Preferably, the particulate matter has a D50 particle size (by volume) of 50 nm to 500 µm, such as 100 nm to 100 µm. More preferably said D50 is 1-30 µm, more preferably 1-20 µm, more preferable 1-5 µm, preferably in combination with a D98 (by volume) of 200 µm or less, more preferably 150 µm or less.

Suitable materials include inorganic inert powders, in particular fillers, such as $CaCO_3$. Preferably, the volume concentration of particulate matter of the primer formulation (PVC) is 0.4-1.0 times the cPVC. The cPVC can be calculated as $$cPVC = \left(\frac{1 + (OA \times \rho)}{93.5}\right)^{-1}$$

wherein OA is the oil absorption value (grams of oil required to wet 100 g of particulate matter, for example as determined with ASTM D281), $\rho$ is the density of the particulate matter (g/ml). In case of several kinds particulate matter are incorporated, the volume weighted average is expressed as $cPVC = \Sigma(V_n \times cPVC_n)$ with $V_n$ the volume fraction of component n. For $CaCO_3$, cPVC is 67.

Preferably, the preparation of the primer formulation comprises dispersing the particulate matter under vigorous mixing, and, after a preferred step of cooling to below 40° C., adding the binder under gentle mixing. This provides good dispersion of the particulate matter. Preferably, the particulate matter is dispersed in a mixture comprising water, a thickening agent such as xanthan gum, and dispersing agent, such as aqueous solution of a fatty acid derivate and polymers, for example TEGO® Dispers 660 C from Evonik.

Accordingly, in a preferred method the surface treatment comprises applying a primer formulation comprising: 10-80 wt. % binder, based on dry weight, preferably selected from the group consisting of styrene acrylic, ethylene acrylic and/or acrylic, and 10-80 wt. % particulate material, preferably having a D50 particle size (by volume) as discussed before, such as 50 nm to 500 µm, or 1-10 µm, the method further comprising applying subsequently a coating layer formulation preferably comprising plant protective products (PPP) and preferably a binder. The invention also relates to treated seeds comprising such a primer layer, i.e. comprising preferably a solidified binder (including a cured and/or dried binder) and preferably particulate material. In particular, the invention further relates to treated seed having such a primer layer as inner layer with a coating layer applied thereon. Preferably, the primer formulation is applied with 5-20 wt. % solid content of polymers, and preferably in an amount of 1-20 g/kg seed, such as 1-10 g/kg seed, or preferably 1-5 g/kg seed.

A further suitable surface treatment comprises exposure to hot and humid air, in particular exposing said seed to a treatment atmosphere for an exposure time of at least 1 second, wherein the treatment atmosphere has a relative humidity of 50% or more and a temperature of 40° C. or more, and cooling and optionally drying said seed. Preferably, said treatment atmosphere has a temperature of 50-100° C. and a relative humidity of 80% or more, and wherein said exposure time is 1 second to 10 minutes, preferably 5-300 seconds. Preferably, the temperature of the treatment atmosphere and/or the dew point is kept substantially constant within a range of 2° C. (total width of the range) for said exposure time. Preferably, the water content of the seed changes during the exposure time by less than 10 wt. % based on the weight of the seed prior to exposure. This preferred treatment provides for good surface roughness without imparting germination of the seed.

Other suitable surface treatments include flame treatment, laser treatment and electron beam surface treatment. Flame treatment comprises exposing the surface to a flame, typically provided by burning a hydrocarbon fuel. Due to the high temperature activated molecules are formed in the exhaust gases, mainly hydroxyl from the dissociation of water and oxygen. In case an air/gas mixture is used, the oxygen content in the exhaust gas may be adjusted with excess oxygen. The concentration of the activated molecules depends on the temperature of the flame. Laser treatment typically comprises subjecting a surface to an excimer laser source, for example to etch patterns by laser ablation. Electron beam surface treatment typically involves forming surface structures by spatially selectively removing material from non-adjacent parts of the surface, for example to create channels or patterns.

The method comprises applying a layer of a coating material onto the treated surface of the seed. Preferably, the treated surface forms the substrate for the coating. The coating is preferably applied as a liquid resin and/or latex composition and thereafter solidified (including cured and/or dried) to form a coating layer. The coating layer is preferably formed directly onto the treated surface of the seed. Accordingly, the coating layer is for example preferably applied directly on a priming layer in case of a primer layer and on a roughened surface in case of a surface treatment to increase surface roughness, such as on an abraded surface in case of abrasion.

Conventional means of coating may be employed for coating the seeds. Various coating machines are available to the person skilled in the art. Some well-known techniques include the use of drum coaters, fluidised bed techniques, rotary coaters (with and without integrated drying) and spouted beds. Preferably, the coating layer is applied by film coating. Preferably, the film coating is applied by spraying the fluid coating material on the seed, typically while the seeds fall or flow through a coating apparatus. Preferably, the coating material is in the form of a liquid coating composition, including coating compositions in the form of a suspension, solution or emulsion.

Preferably the method comprises film coating of the seed to apply a film coating composition comprising a polymeric binder directly onto the treated surface of the seed.

Preferably, the seed coating composition comprises a high-$T_g$ polymeric binder as described hereinafter, more preferably in combination with a low-$T_g$ polymeric component as described hereinafter.

The preferred coating composition comprises one or more binders. The binder typically comprises a polymer. Many suitable binders are known. The binder can for example be selected from the group consisting of polyvinyl acetates, polyvinyl acetate copolymers, polyvinyl alcohols, polyvinyl alcohol copolymers, polyurethane, celluloses (including ethylcelluloses and methylcelluloses, hydroxymethylcelluloses, hydroxypropylcellulose, ethylcellulose, carboxymethylcellulose and hydroxymethylpropylcelluloses), polyvinylpyrolidones, dextrins, maltodextrins, polysaccharides, fats, oils, proteins, gum arabics, shellacs, vinylidene chloride, vinylidene chloride copolymers, calcium lignosulphonates, acrylic copolymers, starches, polyvinylacrylates, zeins, casein, gelatine, chitosan, pullulan, polyethylene oxide, ethylene vinylacetate, acrylimide polymers and copolymers, polyhydroxyethyl acrylate, methylacrylimide monomers, poly(N-vinylacetamide), sodium alginate, polychloroprene and syrups. Also waxes such as carnauba wax, paraffin wax, polyethylene wax, bees wax, and polypropylene wax can be used as a binder. These binders may be used alone or in combination of two or more. Preferred binders include polyvinyl acetates, polyvinyl alcohols, hydroxypropyl methyl cellulose, polysaccharides (such as starch), proteins, polyethylene glycol, and polyvinyl pyrrolidones, polyacrylates, more preferably styrene acrylic polymer, in particular for corn seed.

The amount of binder in the coating composition is normally in the range of 0.1-100 g per kg of the seed, preferably 0.5-50 g per kg of the seed, more preferably 1-20 g per kg of the seed. Based on the total weight of the coating composition, the amount of the binder in the coating composition can for example be 1 wt. % or more, preferably 10 wt. % or more, and 80 wt. % or less, preferably 60 wt. % or less.

The preferred coating composition further comprises one or more active ingredients (including plant enhancing agents, in particular Plant Protective Products, PPPs). Suitable examples of active-ingredients, in particular plant enhancing agents, are fungicidal agents, bactericidal agents, insecticidal agents, nematicidal agents, molluscicidal agents, acaricides or miticides, molluscicides, pesticides, and biocides. Further active ingredients include plant enhancing agents such as disinfectants, micro-organisms, rodent killers, weed killers (herbicides), attracting agents, (bird) repellent agents, plant growth regulators (such as gibberellic acid, auxin or cytokinin), nutrients (such as potassium nitrate, magnesium sulphate, iron chelate), plant hormones, minerals, plant extracts, germination stimulants, pheromones, biological preparations, chitosan, chitine-based preparations, etc. The amount of active ingredient applied, of course, strongly depends on the type of active ingredient and the type of seed used. Usually, however, the amount of one or more active ingredients is in the range of 0.001-200 g per kg of the seed. The skilled person is able to determine suitable amounts of active ingredient depending on the active ingredient and the type of seed used.

Typical fungicidal agents include Captan (N-trichloromethyl)thio-4-cyclohexane-1,2-dicarboximide), Thiram tetramethylthioperoxydicarbonic diamide (commercially available as Proseed™), Metalaxyl (methyl-N-(2,6-dimethylphenyl)-N-(methoxyacetyl)-DL-alaninate), Fludioxonil (4-(2,2-difluoro-1,3-benzodioxol-4-yl)-1-H-pyrrol-3-carbonitril; commercially available in a blend with mefonoxam as Maxim™ XL), difenoconazole (commercially available as Dividend™ 3FS), carbendazim iprodione (commercially available as Rovral™), ipconazole, mefonoxam (commercially available as Apron™ XL), tebuconazole, carboxin, thiabendazole, azoxystrobin, prochloraz, and Oxadixyl (N-(2,6-dimethylphenyl)-2-methoxy-N-(2-oxo-3-oxazolidinyl)acetamide). A fungicide can be included in the seed coating composition in an amount of 0.0001-10 wt. %, based on the total weight of the coated seeds. Typical bactericidal agents include streptomycin, penicillins, tetracyclines, ampicillin, and oxolinic acid. Typical insecticidal agents include pyrethroids, organophosphates, caramoyloximes, pyrazoles, amidines, halogenated hydrocarbons, neonicotinoids, and carbamates and derivatives thereof. Particularly suitable classes of insecticides include organophosphates, phenylpyrazoles and pyretholds. Preferred insecticides are those known as terbufos, chlorpyrifos, fipronil, chlorethoxyfos, tefluthrin, carbofuran, imidacloprid, and tebupirimfos. Commercially available insecticides include imidacloprid (commercially available as Gaucho™), and clothianidin (commercially available from Bayer as Poncho™), thiametoxam (commercially available from Syngenta as Cruiser™) and fipronil (commercially available from BASF as Regent™). Commercially available nematicidal agents include abamectin (commercially available from Syngenta as Avicta™) thiodicarb (commercially available from Bayer as Aeris™). Typical molluscicidal agents include metaldehyde (commercially available from Lonza as Meta®) or niclosamid (commercially available from Bayer as Bayluscide®), Cypermetrin (commercially available from Chemtura as Langis®), Cyazypir and Rynaxypir (available from DuPont). This list is necessary not exhaustive, new active ingredients are continuously developed and can be incorporated in the coating. Coating formulations are often packaged, stored and/or transported and only thereafter combined with formulations of such plant enhancing agents.

The preferred coating composition can comprise further components such as a wetting and dispersing additive (sometimes also referred to as pigment dispersant), a filler, a solvent, a thickener, a colorant, an anti-foaming agent, a preservative, a surfactant, a slip additive and an effect pigment. This also applies to a coating composition comprising a high-$T_g$ polymeric binder as described hereinafter.

Coating formulations are typically prepared by mixing one or more of these components with a suitable binder, packaged, stored and/or transported and are only thereafter combined with formulations of plant enhancing agents.

A wetting and dispersing agent can aid in mixing inorganic particles in the seed coating composition. Suitable wetting and dispersing additives include ionic and non-ionic products and include solutions of organo-modified polyacrylates, polyacrylates, sodium polyacrylate, polyurethane, phosphoric acid ester, star polymers, and/or modified polyethers. The wetting and dispersing additive can for instance be present in some embodiments of the seed coating composition of the invention in an amount of 0-40 wt. % such as at least 1 ppm or 0.10-10 wt. %, based on the total weight of the inorganic particles. Suitable thickeners include agar, carboxy methylcellulose, carrageen, chitin, fucoidan, ghatti, gum arabic, karaya, laminaran, locust bean gum, pectin, alginate, guar gum, xanthan gum and tragacanth, bentonite clays, HEUR (hydrophobically modified, ethoxylated urethane) thickeners, HASE (hydrophobically modified, alkali-swellable emulsion) thickeners and polyacrylates. Gums are generally preferred because of their low cost, availability and superior ability to enhance the physical characteristics of the resultant film.

Examples of colorants include dyes or pigmented pigment dispersions. Examples of suitable dyes include: anthraquinone, triphenylmethane, phthalocyanine and derivatives thereof, and diazonium salts. Pigment dispersions can contain pigments such as pigment red 112 (CAS No. 6535-46-2), pigment red 2 (CAS No. 6041-94-7), pigment red 48:2 (CAS No. 7023-61-2), pigment blue 15:3 (CAS No. 147-14-8), pigment green 36 (CAS No. 14302-13-7), pigment green 7 (CAS No. 1328-53-6), pigment yellow 74 (CAS No. 6358-31-2), pigment orange 5 (CAS No. 3468-63-1), pigment violet 23 (CAS No. 6358-30-1), pigment black 7 (CAS No. 97793-37-8), and pigment white 6 (CAS No. 98084-96-9). The colorant may be present in the seed coating composition in an amount of 0-50 wt. %, such as 1-10 wt. %, based on the total weight of the coating composition.

Examples of suitable anti foaming agents include polyethylene glycol, glycerine, mineral oil defoamers, silicone defoamers, and non silicone defoamers (such as polyethers, polyacrylates), dimethylpolysiloxanes (silicone oils), arylalkyd modified polysiloxanes, polyether siloxane copolymer containing fumed silica. The antifoaming agent may be present in some embodiments of the seed coating composition in an amount of at least 1 ppm or 0.1-0.3 wt. %, based on the total weight of the coating composition.

Examples of suitable effect pigments include pearlescent pigment in different particle sizes. Effect pigments having a particle size of 15 µm or less, or a particle size of 60 µm or less are commonly used. The particle size of the effect pigments is normally not more than 200 µm, preferably not more than 100 µm. Usually, the particle size of the effect pigment is 1 µm or more. Another effect pigment can be aluminium. All effect pigments are commonly used to create a nice cosmetic look on the seeds.

A biocide can be included in some embodiments the seed coating composition of the invention for instance as preservative, in order to prolong the shelf life of the seed coating composition before being applied to a seed, such as when being stored. Examples of suitable biocides include MIT (2-methyl-4-isothiazolin-3-one, CAS No. 2682-20-4) and BIT (1,2-benzisothiazolin-3-one; CAS No. 2632-33-5).

In an embodiment the coating composition further comprises flakes of a translucent polymeric film on an inert carrier (a carrier which has no detectable, harmful consequences for the environment, in particular for the seed or the outgrowing plant in the quantities present) for providing the seeds with a light-reflecting appearance, such as described in WO-A-03/003812. Preferably, the translucent polymeric film comprises light-reflecting particles.

Typically, the method comprises drying of the seed with the applied coating layer. The method may comprise applying one or more coating layers. In case of multiple coating layers, the various layers typically comprise different active ingredients. Optionally, the method comprises as further steps packaging the coated seed and/or storing the coated and/or packaged seed, planting and germination. Preferably, the coated seeds are germinated, for example after planting.

A further advantage of embodiments of the invention is less dusting-off. Dusting-off by release of fragments of the coating in the form of dust particles is a problem because it can result in loss of valuable active ingredients and a less precise and less controlled dosing of the active ingredients. In addition, dusting-off of the coating can sometimes form a risk for the environment and for the health of workers handling the coated seed. Some methods of the invention can provide seeds with a lower Heubach dust value (ESA STAT Working group, 2011), for example a reduction of the Heubach dust value of at least 10% compared to seeds coated without surface treatment.

The invention further relates to a method of preparing coated seed, comprising subjecting seed to a surface treatment, and applying a coating layer onto the treated surface of the seed, preferably with the surface treatment, seed and/or coating material as described, and for example using a coating composition comprising a high-$T_g$ polymeric binder as described.

The invention also relates to coated seed obtainable or prepared by these methods. The coating of such seed shows less rubbing-off and better adhesion to the seed, compared to seed obtained by coating without prior surface treatment of the seed.

The invention further relates to the use of an abrasive material, primer or plasma to increase the adhesion of a coating layer to seed. In this way, abrasive material, primer and/or plasma can be used to obtain the effect of improved adhesion of a coating layer of a coated seed. This provides as advantage reduced rubbing-off of the coated seed during later handling. The preferred plasma, primer and/or abrasive material are as described herein.

The invention further relates to an apparatus for coating of seed, comprising a first chamber for surface-treatment of the seed comprising an inlet for seed and an outlet for surface treated seed, which can be the same or different, one or more surface treatment devices arranged for surface treatment of the seed, selected from a plasma generator, a flame generator, a laser, an electron beam, an abrasive blast injector, and abrasive parts in combination with an actuator for relative movement in said pre-treatment chamber of said abrasive material and seed in contact with each other, and a second chamber for contacting seed with coating composition, which second chamber is downstream of the first chamber, with respect to seed, and comprises an inlet for coating composition and an inlet for seed, an outlet for coated seed, which inlets and outlet of the second chamber can be the same or different.

The apparatus comprises a part comprising a chamber for contacting seed with coating composition. This part is not particularly restricted and can be based on any conventional equipment for seed coating, including a pelleting machine, an encrusting machine and a film coating machine. Suitably, the part for contacting seed with coating composition comprises a rotary film coating apparatus, more in particular a drum coating machine, a rotary batch coater with or without integrated drying, a spray coating machine, a drum pelleting machine, a fluidised bed or a spouted bed coating machine.

In case of abrasive parts, the abrasive material is preferably as described. The actuator may be for moving the abrasive material and/or the seed.

Typically, the second chamber is provided with a dispensing system for dispensing the coating composition to a chamber, in particular as a spray, for example through an atomiser such as a nozzle.

An exemplary seed processing apparatus can comprise a line or system comprising separate modules for abrasion pre-treatment and for applying the coating. Accordingly, the first chamber may be provided in a first module and the second module can be provided in a separate second module, and seed can be transported from the first to the second module by a transport line, such as conveyor lines. The modules can also be line-based, such as comprising a conveyor belt for transport of seed through and/or between the module(s).

The apparatus may also comprise a chamber for plasma pre-treatment, as an alternative to or in addition to the chamber for abrasion pre-treatment. Preferably, the apparatus may comprise a chamber provided with a plasma generator for generating plasma to which seed in said chamber is exposed. Preferably, the plasma generator comprises a dielectric barrier discharge device, more preferably with planar or coaxial configuration. Another preferred plasma generator is a plasma jet generator, for example comprising high-voltage discharge electrodes configured to generate a pulsed electric arc, suitably connected to a 5-15 kV, 10-100 kHz electric power source. The apparatus may comprise a plasma generator as used for the other preferred kinds of plasma treatment.

Other options for the surface treatment devices include a flame generator, a laser, an electron beam, and an abrasive blast injector.

Figure 4:
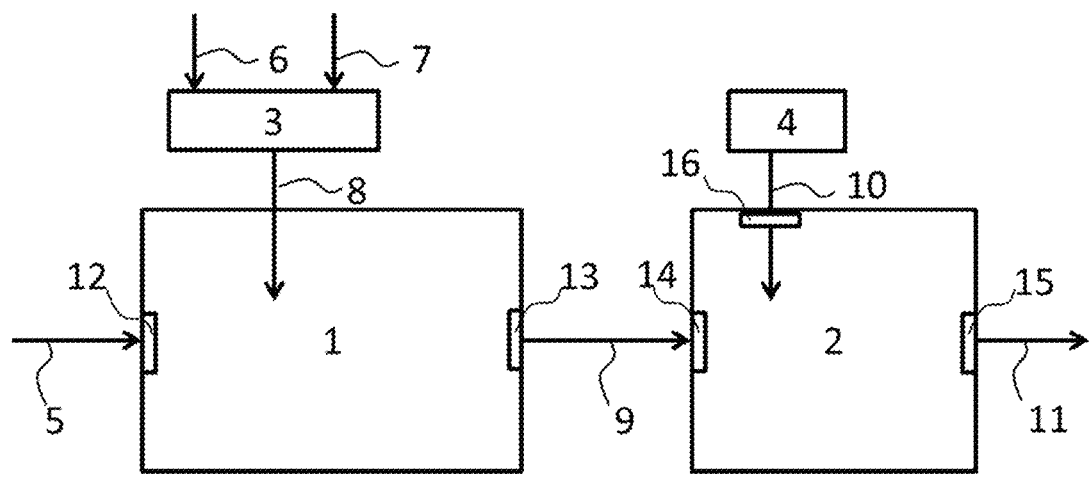
FIG. 4 is a schematic view of an exemplary embodiment of an apparatus according to the present invention.

FIG. 4 is a schematic view of an exemplary embodiment of an apparatus according to the invention. The apparatus comprises first chamber 1, second chamber 2, abrasive blast injector 3 and coating dispenser 4. Seed 5 is provided at the inlet 12 of chamber 1. Air stream 6 and abrasive particles 7 are mixed and pressurised in the blast injector 3 and abrasive blast 8 impinges on the surface of seed 5 in chamber 1. This increases the surface roughness of the seed. The seed is then transported from outlet 13 with transport line 9 to inlet 14 of second chamber 2 where coating 10 from the coating dispenser 4 is sprayed through inlet 16 (a nozzle) over the seed. Coated seed 11 is thereby obtained and moved through outlet 15 from second chamber 2.

A further object of the invention is to provide a seed coating composition, and method of coating seed, that addresses the above-mentioned problems at least in part.

It has surprisingly been found that this objective can be met by using a water-insoluble polymeric binder with a $T_g$ in a particular range. The invention hence also relates to mitigating rubbing-off and preferably increasing wear resistance by using a seed coating with a particular binder. Accordingly, the invention also relates to a method for coating plant seed, comprising applying to said seed a seed coating composition comprising one or more water-insoluble polymers with a $T_g$ of at least 35° C., and to such seed coating composition. The seed coating compositions provide for less rubbing-off. Embodiments provide high wear resistance. Further advantages of at least some embodiments include fast drying, good adhesion of the coating to seed, and reduced stickiness. Embodiments provide for good compatibility with liquid based formulations of plant enhancing agent. Attractive embodiments provide a glossy seed coatings and/or low leaching of plant enhancing agents from the coated seed.

The seed coating composition comprises one or more water-insoluble polymers with a $T_g$ of at least 35° C., preferably at least 40° C., more preferably at least 50° C., more preferably at least 60° C. or at least 70° C., or at least 76° C. or at least 80° C., or at least 90° C., optionally at least 95° C., or at least 100° C., or at least 105° C., typically less than 150° C.; such as a $T_g$ between 70° C. and 120° C. The water-insoluble polymer can for example have a $T_g$ of 35° C. to 70° C. or 70° C. to 150° C. The one or more polymers can be referred to as high-$T_g$ polymeric binder. These preferred higher $T_g$ values apply for all references to these polymers.

The polymer is water-insoluble and hence preferably has a solubility in water, of less than 10 g/l, more preferably less than 1.0 g/l, more preferably less than 0.10 g/l, at 20° C., for example according to ASTM D3132.

For the definition of solubility in water at 20° C., any initial heating to temperatures higher than 20° C. is disregarded, for instance heating required to obtain a solution of the polymer at 20° C., such as for dissolving PVOH. A polymer is considered water-insoluble if it is included in the coating composition at least partly as a dispersion rather than as solution, for instance at 20° C.

The high-$T_g$ polymeric binder suitably has film-forming properties. Typically, the polymer has a MFFT (Minimum Film Forming Temperature) of at least 30° C., preferably at least 40° C., more preferably at least 50° C., more preferably at least 60° C. or at least 70° C. or at least 90° C., or even at least 95° C., typically less than 150° C.

However, preferably the coating composition as applied on the seed has a MFFT (Minimum Film Forming Temperature), and/or $T_g$, of less than 60° C., or less than 40° C., or less than 20° C., or less than 5° C., or at least 10° C. lower than the $T_g$ of the high-$T_g$ polymeric binder, preferably at least 20° C. lower or at least 30° C. lower. Such lower MFFT can be provided by other binders and/or other components of the coating composition as applied to the seed, such as plasticising components provided by a plant enhancing agent formulation. A lower MFFT may contribute to a coating which can be applied at a low temperature, such that seed quality and/or germination properties are not affected. In this way a high-$T_g$ polymeric binder can be used in a coating with good film forming properties, moreover at a low application temperature such that seed quality and germination properties are not affected.

Suitable water-insoluble polymers with a $T_g$ of at least 35° C. include homopolymers and copolymers of vinyl monomers, for instance homopolymers and copolymers of styrene and derivatives (for instance alpha-methyl styrene or vinyl toluene), homopolymers and copolymers of vinyl butyral, homopolymers and copolymers of vinyl chloride and homopolymers and copolymers of acrylonitrile.

Preferably, at least one of said one or more water-insoluble polymers with a $T_g$ of at least 35° C. is an acrylic polymer.

Suitable acrylic polymers include homopolymers and copolymers of acrylic acid and/or methacrylic acid, and the esters, salts and conjugate bases thereof, having a $T_g$ as specified. For example, suitable monomers include (meth) acrylic acid esters containing from 1-12 carbon atoms, preferably 2-6 carbon atoms, in the ester portion, preferably alkyl esters. An example is $C_2$-$C_6$ alkyl esters of (meth) acrylic acid. Preferred co-monomers include alkenes such as vinyl co-monomers, in particular styrene. Examples include homopolymers and copolymers of methyl methacrylate.

Some examples of suitable polymers include AC-191, AC-205, AC-215, AC-295 available from Picassian; Joncryl® 1992, Joncryl® 90, Joncryl® 661 available from BASF; Licomer® M63, Licomer® A623 available from Michelman, Ecroprint® D280, Ecroflex® F55D, Thyon® HF18 available from Ecronova Polymer; Setalux® 6438, Setalux® 6482 available from Nuplex; Mowilith® LDM 7991 available from Celanese; NeoCryl® XK-52, NeoCryl® A-550, NeoCryl® A-639, NeoCryl® A-1091, NeoCryl® A-1105, NeoCryl® A-1131, NeoCryl® A-2091, NeoCryl® SR-210, NeoCryl® SR-270 available from DSM; ENCOR® 2455, ENCOR® 7408, ENCOR® 8405 available from Arkema; Arolon® 845-W-45, Arolon® 860-W-45 available from Reichhold; Plextol® DV686 available from Synthomer; Ucecryl® B 3025 available from Allnex.

Preferably, the seed coating composition comprises at least 0.10 wt. % of total water-insoluble polymers with a $T_g$ of at least 35° C., more preferably at least 1.0 wt. %, or at least 2.0 wt. %, or at least 5.0 wt. %, based on total weight of the seed coating composition. The same preferred amounts apply for acrylic water-insoluble polymers, such as with a $T_g$ of at least 60° C. Before the optional combination with a plant enhancing agent formulation, the seed coating composition may for instance comprise at least 10 wt. % or at least 20 wt. % or even at least 30 wt. % of high-$T_g$ polymeric binder.

Preferably, the seed coating composition further comprising one or more additional polymers with a $T_g$ of less than 30° C. (low-$T_g$ polymeric binder), more preferably with a $T_g$ of less than 20° C. or less than 5° C. or even less than 0° C., typically with a $T_g$ higher than −30° C. Optionally, such one or more additional polymers can be included as a multiphase material comprising at least one phase having such $T_g$, for instance as core-shell particles having a core or a shell with such $T_g$, preferably with a shell having such $T_g$.

Preferably, the seed coating composition has a weight ratio of high-$T_g$ polymeric binder to low-$T_g$ polymeric binder in the range of 10:1 to 1:5, preferably in the range of 5:1 to 1:2, such as 2:1 to 0.9:1, preferably about 1:1. In particular the composition can have a ration in such range for water-insoluble polymers with $T_g$ of at least 35° C., such as at least 60° C., to additional polymers with a $T_g$ of less than 30° C., such as less than 10° C.

These preferred weight ratio ranges apply to the total amount of high-$T_g$ and low-$T_g$ polymeric binder. The used weight ratio can be optimised for different concentrations of plasticisers, storage conditions, in particular temperature, and for temperatures at which the coating is applied to the seeds, and to the used plant enhancing agent formulations.

An advantage of combinations of a high-$T_g$ and low-$T_g$ polymeric binder is the good wear resistance. Another advantage is increased flexibility for combining with formulations of plant enhancing agents and better compatibility with liquid based formulations of plant enhancing agents, in particular PPPs. In particular, the preferred seed coating composition can for instance be adjusted for the one or more PPPs with which it is combined by adjusting the ratio between high-$T_g$ and low-$T_g$ polymeric binder. A further advantage of the combination of high-$T_g$ and low-$T_g$ polymeric binder is that higher total polymeric binder concentrations can be used than the maximum for low-$T_g$ polymeric binder alone. Often, compositions with high concentrations of low-$T_g$ polymeric binder become tacky or sticky. By combining low-$T_g$ and high-$T_g$ polymeric binders, reduced stickiness of the coating can be obtained in combination with good wear resistance and/or reduced rubbing-off. Preferably, said one or more additional polymers include an acrylic polymer with a $T_g$ of less than 30° C. Generally, suitable acrylic polymers include homopolymers and copolymers of acrylic acid and methacrylic acid, and the esters, salts and conjugates bases thereof, having a $T_g$ as specified. The same monomers and co-monomers as for the high-$T_g$ polymeric binder can be used provided that the polymer has a $T_g$ as specified.

Preferably, the one or more water-insoluble polymers and the one or more additional polymer both include acrylic polymers. Preferably, the composition comprises water-insoluble acrylic polymers with a $T_g$ of at least 60° C. and acrylic polymers a $T_g$ of less than 30° C., preferably less than 10° C.

Preferably, said one or more water-insoluble polymers with $T_g$ of at least 35° C. are at least partly included as dispersion in the coating composition, rather than in dissolved form. For instance at least part of the polymer can be included as an emulsion thereof, preferably in combination with an aqueous dispersion of at least part of the low-$T_g$ polymeric binder. For example, at least part of both the low-$T_g$ and high-$T_g$ polymeric binder can be supplied as latex and mixed. Preferably, the composition comprises a dispersion of particles comprising high-$T_g$ polymeric binder and particles comprising low-$T_g$ polymeric binder. The particles may be multiphase particles, such as core-shell particles, having at least one phase, for instance a shell, of material having such $T_g$.

Preferably, said one or more water-insoluble polymers (high-$T_g$ polymeric binder) have a $T_g$ of at least a temperature T1 and said one or more additional polymers (low-$T_g$ polymeric binder) have a $T_g$ of less than a temperature T2, wherein T1 is at least 10° C. higher than T2, more preferably at least 20° C. or at least 40° C., even more preferably at least 50° C. or at least 60° C., for instance at least 90° C. or at least 100° C., optionally less than 150° C. higher. A large difference in $T_g$ advantageously provides improved coating properties, in particular wear resistance.

As discussed hereinabove, the seed coating composition often comprises one or more selected from the group consisting of a wetting and dispersing additive, a filler, a solvent and/or a diluent, a thickener, a colorant, an anti-foaming agent, an anti-freeze agent, a preservative, a surfactant, a wax, a flow agent, and an effect pigment. Typically, such additives are included in the seed coating composition before combining with a plant enhancing agent formulation. The coating composition may comprise for instance 5 to 100 wt. %, based on total weight of water-insoluble polymers with $T_g$ of at least 35° C., of filler, water, a wax or an effect pigment, or a combination of any or all of these. Preferably, the coating composition comprises a filler, water, a wax and an effect pigment. Preferably, the seed coating composition comprises one or more of the preferred additives as described hereinbefore. Preferably, the one or more additives are not phytotoxic. Preferably, the one or more additives are not detrimental to germination of seed. The skilled person in the field of coatings for plant seed can easily select appropriate additives.

Preferably, the seed coating composition comprises wax. For example, polyethylene wax can be used, such as with formula $(CH_2)_nH_2$, where n ranges between about 50 and 100. Polyethylene wax, in particular oxidized polyethylene wax and modified polyethylene wax, gave good results. Preferably, the composition has a weight ratio of wax to water-insoluble polymers with $T_g$ of at least 35° C. (high-$T_g$ polymeric binder) in the range of 1:50 to 1:1, for instance 1:20 to 1:1. This provides better wear resistance at 3 weeks after coating.

The invention also relates to a preferred method for preparing a seed coating composition, comprising combining (a) a coating formulation comprising one or more water-insoluble polymers with $T_g$ of at least 35° C., preferably at least partly as an aqueous dispersion, with (b) at least one plant enhancing agent formulation comprising a plant enhancing agent, and (c) optional other components, for instance optional diluents such as water. Preferably the method comprises providing separate formulations (a) and (b). The coating formulation (a) preferably comprises one or more additional polymers with a $T_g$ of less than 30° C. Preferably the formulation (b) is liquid based and comprises one or more plasticising components and/or one or more components selected from the group consisting of a non-aqueous solvent, a surfactant and an anti-freeze agent, which are optionally said plasticising component. Coating formulation (a) can be especially useful for combining with a liquid based plant enhancing agent formulation (b1) and an optional particulate plant enhancing agent formulation (b2), for example of thiamethoxam, since this provides a combination of good binding strength for formulation b2 and good rubbing-off resistance for formulation b1. Particulate formulation b2 does typically not dissolve in the combined coating composition. The combining can for instance be carried out by blending the components together before application to plant seed, for instance in coating equipment. It may also be carried out during application to the seed, in particular by subsequent or simultaneous application of the components to the seed.

The invention also relates to a kit of parts, comprising (a) a coating formulation comprising one or more water-insoluble polymers with $T_g$ of at least 35° C., preferably at least partly as aqueous dispersion, and (b) at least one liquid based formulation comprising a plant enhancing agent and one or more components selected from the group consisting of non-aqueous solvents, surfactants and antifreeze agents, and, optionally, (c) one or more additional polymers with a $T_g$ of less than 30° C. For instance (a) and (c) can be combined in a coating formulation. Formulation (b) is for instance an agrochemical formulation comprising at least one pesticide, optionally not comprising a polymer as defined in (a) and (c). For example (a) and (b) can be supplied in separate containers.

The invention further relates to a method for coating plant seed, comprising applying to said seed a seed coating composition comprising a one or more water-insoluble polymers with a $T_g$ of at least 35° C. The method typically involves forming on the surface of the seeds a firmly adhering, moisture-permeable coating. The process typically comprises applying a fluid seed coating composition to the seeds seed before planting. Preferably, the seed is capable of germinating. The seed coating composition is for instance applied by film coating, spraying, dipping, or brushing of the seed coating composition. Optionally, it is applied at a temperature of −25° C. to 50° C., for instance −5° C. to 35° C., more often 15° C. to 30° C., for instance at room temperature, such as 18° C. to 25° C., or at a temperature at least 10° C. lower than the $T_g$ of the high-$T_g$ polymeric binder, preferably at least 20° C. lower. The coating composition as applied on the seed typically has film forming properties at the application temperature, at least in these ranges. Preferably the coating composition has a MFFT below these maximum temperatures, more preferably below these minimum temperatures. Lower maximum application temperatures are preferred to avoid affecting seed quality and germination.

Suitably, the coating composition is applied to the seed in a rotary batch coater, optionally with integrated drying. Typically the coating is applied as a layer of 1 to 500 µm, for instance 20 to 200 µm. Conventional means of coating may be employed for coating the seeds. Various coating machines are available to the person skilled in the art. Some well-known techniques include the use of drum coaters, fluidised bed techniques, rotary coaters (with and without integrated drying) and spouted beds. Preferably, the coating layer is applied by film coating. Preferably, the film coating is applied by spraying a fluid coating composition on the seed, typically while the seeds fall or flow through a coating apparatus. After application, the coating is typically dried, solidified, and/or allowed to harden, typically by evaporation of a liquid component, after which the coated seed can be further treated, packaged, stored and/or planted.

Optionally, the seed to which the coating is applied may be deprived of husk (so-called husked seed or de-hulled seed). The seed may be primed or not primed (having been subjected to a treatment to improve the germination rate, e.g. osmopriming, hydropriming, matrix priming).

Preferably, the one or more water-insoluble polymers with $T_g$ of at least 35° C. (high-$T_g$ polymeric binder) are applied in an amount of at least 0.10 g/kg seed, preferably at least 0.20 g/kg seed, typically less than 100 g/kg seed, for instance 0.50-50 g/kg seed, more preferably 1.0-20 g/kg seed. The total amount of binder in the coating composition is normally in the range of 0.10-100 g/kg seed, preferably 0.50-50 g/kg seed, more preferably 1.0-20 g/kg seed. These ranges also apply for the total amount of polymeric binder and the total amount of any acrylic polymers comprised therein. Preferably, low-$T_g$ polymeric binder is applied in an amount of 0.10-50 g/kg seed, preferably 0.50-50 g/kg seed, more preferably 1.0-20 g/kg seed.

Preferably, the seed is selected from the group consisting of corn seed, flax, beans, asparagus, peas and okra; more preferably said seed is corn seed. For these crops, good adhesion is important to improve wear resistance. Other suitable crops include those described hereinbefore.

Preferably, the method comprises first subjecting seed to a surface treatment as described herein and subsequently applying the coating composition. Improved wear resistance directly after coating or at 3 weeks after coating was obtained by using a primer. Particularly good wear resistance was obtained by applying the coating composition on seeds of which the surface roughness had been increased, in particular for corn seed.

An exemplary method comprises combining said seed coating composition with a liquid based formulation which comprises a plant enhancing agent and one or more components selected from a co-solvent and/or non-aqueous solvent, a surfactant, and antifreeze agent, in particular wherein these components have a plasticising effect. This allows for benefiting from a plasticising effect of such components. Moreover, the high-$T_g$ polymeric binder may mitigate any detrimental effect on coating properties of such components.

Co-solvents include, but are not restricted to, compounds which are liquid at 20° C. and 1 atm and in which at least one of said plant enhancing agent has a higher solubility than in water. Typically, organic compounds which are liquid at 20° C. and 1 atm can be used, for instance protic or aprotic organic solvents.

Examples of such co-solvents and other plasticising components include: glycols and their esters and ethers, in particular ethylene and propylene glycols and their esters and ethers, for instance esters and ethers with $C_1$-$C_6$ alkyl groups and/or aromatic groups, such as methyl, ethyl, propyl, butyl, benzyl and phenyl ethers, including mono ethers and dialkyl ethers, and esters of these ethers, such as acetates, and ethylene and propylene glycol esters, for instance of fatty acids; polyethylene glycol (PEG) and polypropylene glycol and esters thereof, especially with fatty acids; butyl cellosolve, butyl carbitol, polyethylene glycol; N-methylpyrrolidone, glycerine, alkyl alcohols with up to 10 carbon atoms, such as ethanol, propanol and butanol. Other examples of co-solvents include dipropylene glycol methyl ether and propylene glycol methyl ether. An important co-solvent is ethylene glycol. Further examples include propylene tetramer and synthetic ester oils such as lactate esters, particularly ethyl lactate and benzoate esters e.g. iso-propyl or 2-ethylhexyl benzoates. Aromatic hydrocarbons such as xylene, aliphatic and paraffinic solvents and vegetable oils can also be used as co-solvent. Aromatic solvents are less preferred.

The liquid based formulation may also comprise other components with a plasticising effect, such as surfactants or antifreeze agents. Common surfactants include amphiphilic organic compounds, usually comprising a branched, linear or aromatic hydrocarbon, fluorocarbon or siloxane chain as tail and a hydrophilic group. Some types of surfactants include non-ionic, anionic, cationic and amphoteric surfactants, and organosilicone and organofluorine surfactants. Some examples of surfactants include polyoxyethylene glycol and polyoxypropylene ethers and esters, in particular alkyl, aryl and alkylaryl ethers thereof, and sulphates, phosphates and sulphonic acid compounds of such ethers, glucoside (alkyl) ethers, glycerol esters, such as alkyl and fatty acid esters, sorbitan (alkyl) esters, acetylene compounds, cocamide compounds, block copolymers of polyethylene glycol and propylene glycol. Further examples of surfactants include alkylamine salts and alkyl quaternary ammonium salts, for example betain type surfactants, amino acid type surfactants; and polyhedric alcohols, fatty acid esters, in particular $C_{12}$-$C_{18}$ fatty acids, for instance of polyglycerin, pentaerythritol, sorbitol, sorbitan, and sucrose, polyhydric alcohol alkyl ethers, fatty acid alkanol amides, and propoxylated and ethoxylated compounds such as fatty alcohol ethoxylates, polyethyxlated tallow amine and alkylphenol ethoxylates. Some examples of anionic surfactants include carboxylic acids, copolymers of carboxylic acids, sulphates, sulphonic acid compounds and phosphates, for example lignin sulphonates and (linear) alkylaryl sulphonates.

Anti-freeze agents include for example: ethylene glycol, propylene glycol, 1,3-butylene glycol, hexylene glycol, diethylene glycol, and glycerin, with the preferred glycol being ethylene glycol and propylene glycol.

Accordingly, an example seed coating composition may comprise such co-solvents and other components with a plasticising effect in a weight ratio to high-$T_g$ polymeric binder of 1:100 to 2:1, for instance 1:20 to 1:2, optionally for any of these or for total amount of co-solvent.

A special advantage is that the high-$T_g$ polymeric binder has good compatibility with many liquid based formulations of plant enhancing agents compared to a coating composition not comprising a high-$T_g$ polymeric binder. Without wishing to be bound by way of theory, the better compatibility can be the result of many of these liquid based formulations comprising one or more components which have a plasticising effect on the coating, such as co-solvents. Such components accordingly have a detrimental effect for conventional seed coatings. In contrast, for the high-$T_g$ polymeric binder, a plasticising effect of components of liquid based formulations may be beneficial for the coating properties.

The invention also relates to coated seed having a coating comprising one or more water-insoluble polymers with $T_g$ of at least 35° C., preferably coated with a coating composition as described. The coating composition can be still wet or can be partially or completely dried. The invention also relates to coating material next to a seed or attached to a seed, and to a coating applied on a plant seed, comprising one or more water-insoluble polymers with $T_g$ of at least 35° C., preferably with a coating composition as described. The invention also relates to coated seed obtainable by or prepared by any of the described methods of coating seed.

The coating on the seed preferably comprises a plant enhancing agent as described hereinbefore, for example in an amount of 0.0010-20 wt. %, for instance 1.0-10 wt. %, based on dry or wet weight of the coating, for each plant enhancing agent separately. Accordingly, the coating composition as applied to the seed, for instance in the coater, preferably comprises one or more plant enhancing agents, for example in an amount of 0.0010-20 wt. %, based on wet weight of the coating mixture. The present invention also relates to coating material in contact with plant seed, comprising one or more water-insoluble polymers with $T_g$ of at least 35° C. and preferably one or more plant enhancing agents as described. The coating composition is especially attractive for PPP cocktails comprising both a particulate PPP and a liquid based PPP formulation. Some PPP cocktails for which the coating composition is attractive include, for example a cocktail comprising thiamethoxam and tebuconazole and optionally fludioxonil and metalaxyl-M; emulsion based formulations comprising cypermethrin; and a cocktail comprising cypermethrin, tebuconazole, fludioxonil and metalaxyl-M. Some PPPs for which the coating compositions are particularly advantageous include Raxil 60FS (tebuconazole), Langis (cypermethrin), Signal 300ES (cypermethrin), Vitavax 34 (carboxin), Rancona Pinnacle (ipconazole/metalaxyl), Dimension 2 EW (dithiopyr), Proseed (thiram), Vibrance Quattro (sedaxane/difenoconazole/fludioxonil/metalaxyl), Dividend XL RTA (difenoconazole/mefenoxam), Rovral Flo (iprodione), Gaucho 600 (imidacloprid). However, the coating composition may be suitable for numerous other PPPs.

The invention also relates to the use of one or more water-insoluble polymers with $T_g$ of at least 35° C. as a polymeric binder in a seed coating of coated plant seed for improving wear resistance of said coated plant seed, and/or for reducing rubbing-off of said seed coating from said coated plant seed. For example the use of the polymers can be for obtaining the effect of higher wear resistance of the coating compared to coatings with polymers having a $T_g$ lower than 35° C. The coated seed are preferably capable of germinating and can preferably be used in a method of growing plants, which method comprises such coated seeds and allowing plants to grow from the seed.

The invention has been described by reference to various embodiments, compositions and methods. The skilled person understands that features of various embodiments, compositions and methods can be combined with each other. For instance, preferred coating compositions can be used in the various methods, in the same way preferred steps of a method can be combined with each other and with preferred coating compositions. The various surface treatments can be combined with the various methods and coating compositions comprising a high-$T_g$ polymeric binder.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include and intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention will now be further illustrated by the following non-limiting examples.

EXAMPLES

Example 1

Corn seeds of two seed lots (seed lot A and seed lot B, of different varieties) were sanded in a rotary coater that was provided with sanding paper. Thereafter, the seed were coated with a coating composition comprising 1 ml Maxim XL per kg corn, 90 ml Cruiser FS 350 per 50 000 corn seeds, L350 in an amount of 1.5 ml/kg seed, and balance water. Herein, Cruiser is a commercial available insecticide formulation from Syngenta containing thiametoxam as active ingredient. Maxim XL is a fungicide containing metalaxyl and fludioxonil available from Syngenta. Disco™ L350 is a commercial film coating formulation available from Incotec comprising as binder a styrene acrylic, red pigment dispersion, and $TiO_2$ coated mica flakes as effect pigment.

Table 1 gives results of a wear resistance test of the treated and coated corn samples. A high wear (value 2.0 or more) indicates severe wear. Commercial sanding paper sold as grit size P60, P120 and P240 was used for the surface treatment. The corn seed was moved on the sanding paper for a specific time. The wear test was carried out direct after coating and 3 weeks after coating. Two types of wear test were carried out, one with a wear test time of 10 minutes, the other with 20 minutes.

For seed lot A (experiments 1-7), surface treatment involving sanding with P60 for 10, 20 or 30 minutes resulted in an excellent adhesion of the coating on corn. After 5 minutes the adhesion was a little bit less than after 10 minutes sanding, 1 minute sanding was not enough. After 7 minutes and 30 seconds of sanding the adhesion was almost on the same level as after 10 minutes sanding.

Different types of sand paper were used study the effect the adhesion on corn (experiments 8-12). Using the finer P120 and P240 paper resulted in the same level of adhesion on corn after sending the corn for 10 and 20 minutes. The adhesion on corn was very good. The coating was applied at 20° C., 39% relative humidity, with an injection time of 6 seconds and a moving time after application of 10 seconds in a rotary coater.

To see if the results depended on the seed lot, another seed lot B was treated (experiments 13-16). This seed lot B had a poorer initial adhesion on the corn than seed lot A. Sanding for 10 minutes resulted in an improved wear resistance of the applied coating, but not as good as for seed lot A. Therefore, the duration of sanding was increased to 20 minutes of sanding with P60 resulted in a good adhesion on the corn of seed lot B. 30 minutes did not improve the adhesion any more. From this can be concluded that the sanding time can be optimised for the seed lot.

In experiment 17, instead of sanding paper, a sanding mat cut in 4 $cm^2$ pieces was used and added to corn seeds as scrubbing material. For 30 minutes the seeds were sanded in the rotary machine. After that the seeds were treated with the coating slurry and the adhesion was determined. It could be concluded also this way of sanding resulted in a very good adhesion of the coating on corn and reduced wear.

It was further observed that after the wear test, the sanded corn seeds were looking more glossy than the seeds without sanding. It seems that the flow agent and effect pigments are much more visible. In addition, it was observed that the equipment did not become dirty or dusty using the sanded seeds (less dusting-off), this contrary to the seeds that were not sanded. The flow ability of sanded seed was also better. These are further advantages of the method of the invention by virtue of the coating remaining a proper layer even after 20 minutes of the wear test.

TABLE 1

| | | | | Wear resistance (c) | | | |
| | | | | Test direct after coating | | Test after 3 weeks | |
| | Seed | Sand | Sanding duration | Wear test time | | | |
| Exp. | lot | paper | (min) | 10 min | 20 min | 10 min | 20 min |
| 1[a] | A | None | 0 | 2.5 | 3.5 | 2.0 | 3 |
| 2 | A | P60 | 10 | 0.1 | 0.2 | 0.1 | 0.1 |

TABLE 1-continued

| | | | | Wear resistance (c) | | | |
| | | | | Test direct after coating | | Test after 3 weeks | |
| | Seed | Sand | Sanding duration | Wear test time | | | |
| Exp. | lot | paper | (min) | 10 min | 20 min | 10 min | 20 min |
| 3 | A | P60 | 20 | 0.1 | 0.2 | 0.1 | 0.1 |
| 4 | A | P60 | 30 | 0.1 | 0.2 | 0.1 | 0.1 |
| 5 | A | P60 | 5 | 1.0 | 2.0 | 0.2 | 0.5 |
| 6 | A | P60 | 1 | 2.5 | 3.5 | 2.0 | 2.5 |
| 7 | A | P60 | 7.5 | 0.2 | 0.3 | 0.2 | 0.2 |
| 8 | A | P120 | 10 | 0.1 | 0.2 | 0.1 | 0.1 |
| 9 | A | P120 | 20 | 0.1 | 0.2 | 0.1 | 0.1 |
| 10 | A | P240 | 10 | 0.1 | 0.2 | 0.1 | 0.1 |
| 11 | A | P240 | 20 | 0.1 | 0.2 | 0.1 | 0.1 |
| 12[b] | A | P240 | 30 | 0.5 | 1.5 | 0.2 | 1.0 |
| 13[a] | B | None | 0 | 4.5 | 5 | 4.0 | 4.5 |
| 14 | B | P60 | 10 | 1.5 | 2.5 | 0.2 | 0.5 |
| 15 | B | P60 | 20 | 0.2 | 0.5 | 0.2 | 0.4 |
| 16 | B | P60 | 30 | 0.2 | 0.5 | 0.2 | 0.4 |
| 17 | A | Scrub | 30 | 0.1 | 0.2 | 0.1 | 0.2 |

[a] comparative;
[b] 1 ml L350
(c) 0: perfect, 5: very poor

Example 2

FIG. 1 shows results of example 2. FIG. 1a shows a comparative corn seed of seed lot A that was not sanded and was coated with coating composition A and after some time subjected to a 20 min wear test. The dark parts are remaining coating. The light parts show where the coating was displaced during the wear test. This shows poor adhesion of the coating with a comparative coating method and indicates severe wear. FIG. 1b shows a corn seed prepared with the method of the invention. The corn seed of seed lot A was sanded for 20 min. with P60 and thereafter coated with coating composition A. The light parts were coating is displaced in the wear test are much smaller than in FIG. 1a. This demonstrates improved adhesion of the coating and reduced wear, in particular non-loss wear.

Example 3

Figure 2:
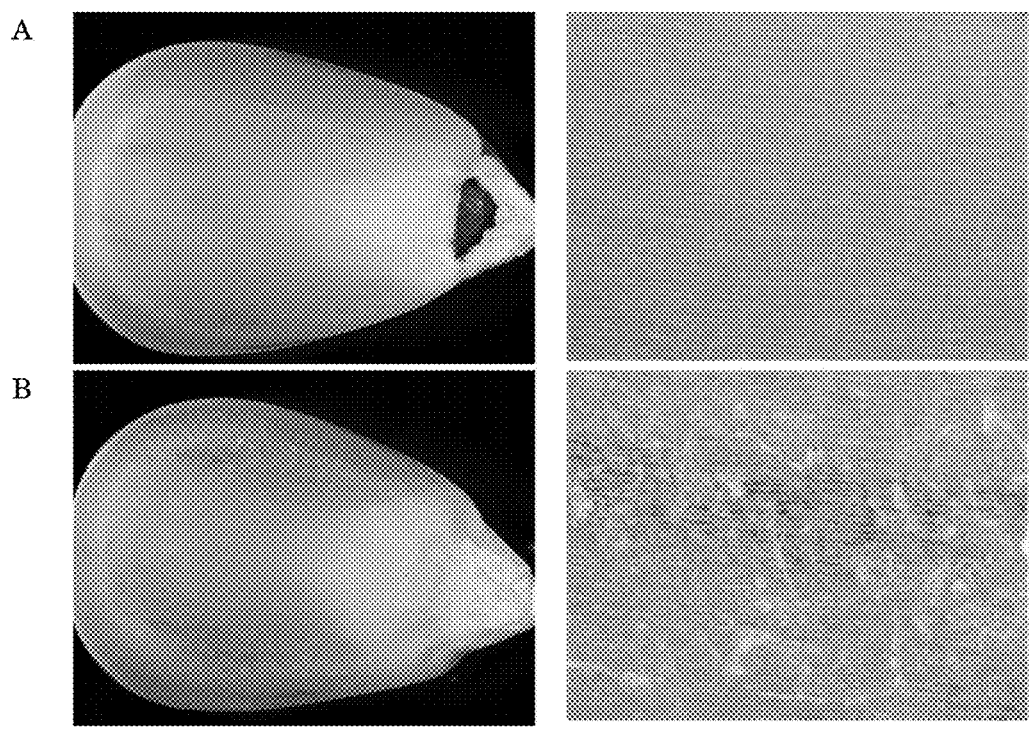
FIG. 2A shows a corn seed that was not sanded and FIG. 2B shows a corn seed that was sanded with P60 for 10 minutes.

FIG. 2 shows results of example 3. In example 3, corn seed of seed lot B was not sanded (FIG. 2, A) or was sanded with P60 for 10 minutes (FIG. 2, B). FIG. 2 shows the seed (left column) and a magnification of the surface (right column). Sanding resulted in visible scratches and increased surface roughness in B.

Example 4

Figure 3:
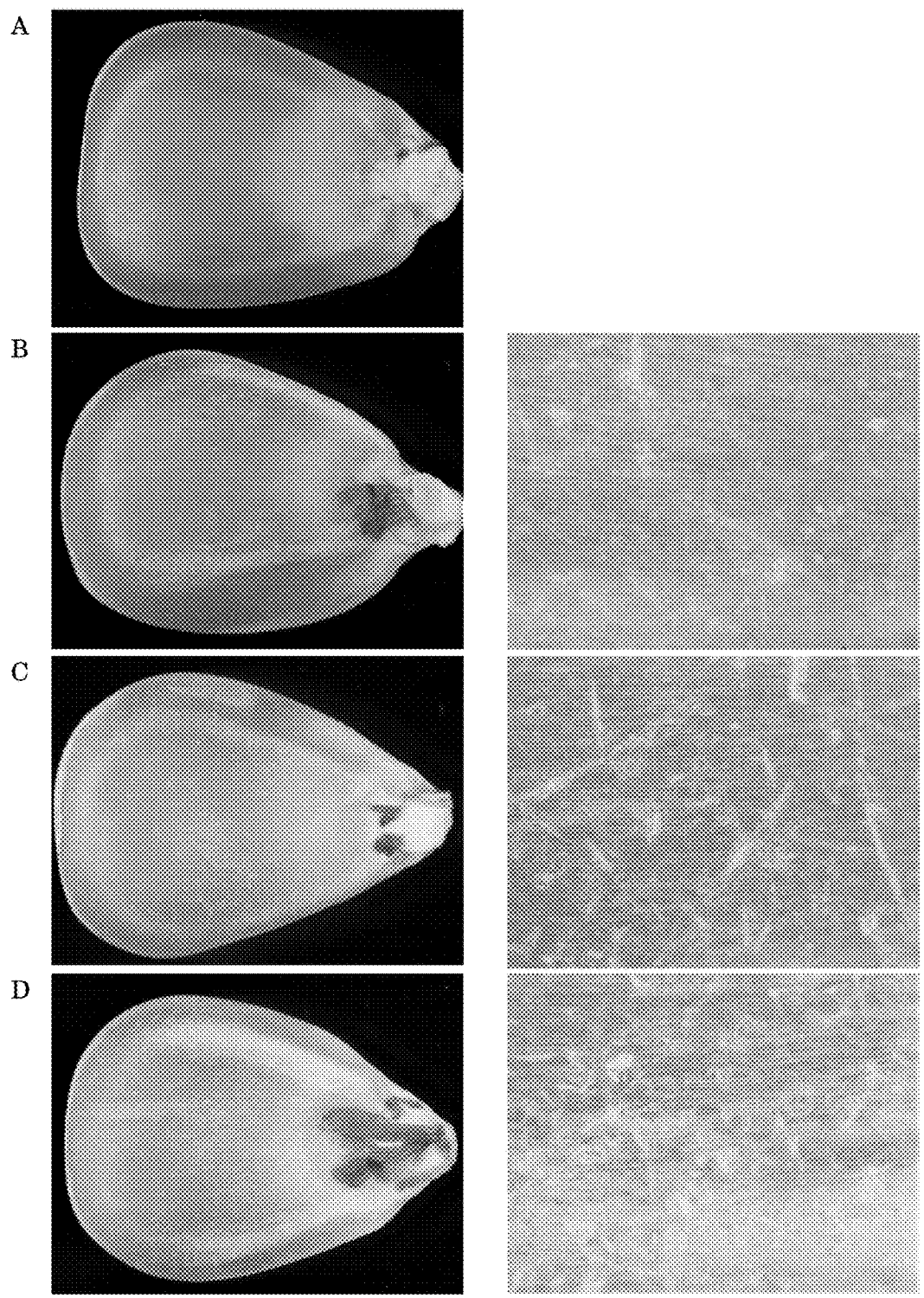
FIG. 3A shows a corn seed that was not sanded.
FIG. 3B shows a corn seed that was sanded with P60 for 10 minutes.
FIG. 3C shows a corn seed that was sanded with P60 for 20 minutes.
FIG. 3D shows a corn seed that was sanded with P60 for 30 minutes.

FIG. 3 shows corn seed of seed lot A that were not sanded (A) or sanded with P60 sanding paper for 10 minutes (B), 20 minutes (C) or 30 minutes (D). FIG. 3 shows the seed (left column) and a magnification of the surface (right column). Clearly scratches and grooves are formed (lighter parts) by the sanding, increasing with sanding time. This demonstrates that the surface roughness of the corn seed is increased by the sanding.

Example 5

In this experiment, corn seed of seed lot A was sanded for 10 minutes with P60 sanding paper, or P120, P240, or for 30 minutes with the scrub material. No difference was visible in the surface of the corn.

Example 6

The germination of the sanded and coated seed was tested for seed lot A. The germination test was based on a 20° C. dark period of 16 hours and a 30° C. light period for 8 hours, on folded filter paper in a germination box with 60 cc water. Without sanding, with coating, 93% good seedlings were obtained. With 30 minutes P60 sanding, and with coating, 95% good seedlings were obtained. Similar good results were obtained with 10 min sanding and 20 minutes sanding with P60 sanding paper. With abrasion for 30 min. with scrub material and with coating, 98% good seedlings were obtained.

Example 7

The aim is to test a primer layer that will improve the adhesion of a slurry of Cruiser and Maxim XL on corn. The filler material was $CaCO_3$ with D50 particle size of 2.8 μm and D98 of 120 μm. cPVC of the formulation is 67, hence a ratio of 100 g $CaCO_3$ to 20 g polymer (100% solids). The binder compositions are given in table 2. In step 1, the filler is $CaCO_3$ with D50 of 2.8 μm and D98 of 120 μm. The filler was dispersed in water, xanthan gum and dispersing agent (TEGO® Dispers 660 C from Evonik, this is an aqueous solution of a fatty acid derivate and polymers). After that, the mixture is allowed to cool to below 40° C. In step 2, the binder and other raw materials were added under gentle mixing. The primer formulation was applied on corn such that the solid content of polymers was 12.6 wt. %, the formulation (polymer/water/pigment dispersion mixture) were diluted with water and applied in 10 g/kg corn. The seeds were then coated with a cocktail consisting of Maxim 1.05 g (1 ml/kg seeds), Cruiser 7.34 g (90 ml per 50 000 seeds), Film coat: 1.83 g (1.5 ml/kg seed), water complement to 4.78 ml, total amount 15 g slurry/kg seed. After coating, the same wear test was performed as in example 1. The combinations of primer layer and coating are given in table 3. First layer is the primer, second layer is the slurry cocktail that is applied afterwards. Disco™ L350 and L800 are also tested as primer formulations. Disco™ L800 is a film coating composition commercially available from Incotec.

TABLE 2

| Compositions of primer blends (wt. %) | | | | | | | |
|---|---|---|---|---|---|---|---|
| | A91 | A92 | A93 | A94 | A95 | A08 | A09 |
| Step 1 | | | | | | | |
| water | 10.00 | 19.06 | 10.00 | 19.06 | 10.00 | 10.00 | 19.06 |
| xanthan gum | 0.10 | 0.10 | 0.10 | 0.10 | 0.10 | 0.10 | 0.10 |
| dispersing agent | 0.70 | 1.15 | 0.70 | 1.15 | 0.70 | 0.70 | 1.15 |
| Filler | 30.00 | 50.00 | 30.00 | 50.00 | 30.00 | 30.00 | 50.00 |
| Step 2 | | | | | | | |
| water | 17.71 | 8.60 | 14.11 | 6.80 | 18.51 | 18.51 | 9.00 |
| xanthan gum | 0.10 | 0.10 | 0.10 | 0.10 | 0.10 | 0.10 | 0.10 |
| Additive | 0.20 | 0.20 | 0.20 | 0.20 | 0.20 | 0.20 | 0.20 |
| Additive | 0.30 | 0.30 | 0.30 | 0.30 | 0.30 | 0.30 | 0.30 |
| Additive | 0.09 | 0.09 | 0.09 | 0.09 | 0.09 | 0.09 | 0.09 |
| Binder | | | | | | | |
| Styrene acrylic | 40.80 | 20.40 | | | | | |
| Acrylic | | | 44.40 | 22.20 | | | |
| Styrene acrylic | | | | | 40.00 | | |
| Acrylic | | | | | | 40.00 | 20.00 |
| Total | 100 | 100 | 100 | 100 | 100 | 100 | 100 |
| PVC | 38 | 67 | 38 | 67 | 38 | 38 | 67 |

TABLE 3 combinations of primers and coatings

| Exp. | Primer | Remarks |
|---|---|---|
| 11 | — | 11 g PPP slurry (comparative) |
| 12 | — | 15 g PPP/L350 slurry (comparative) |
| 13 | A91 | $1^{st}$ layer 10 g. $2^{nd}$ layer 15 g PPP/L350 slurry |
| 14 | A91 | $1^{st}$ layer 10 g. $2^{nd}$ layer 11 g PPP slurry $^{(1)}$ |
| 15 | A91 | $1^{st}$ layer 10 g. 1 day after, $2^{nd}$ layer 15 g PPP/L350 slurry |
| 16 | A91 | $1^{st}$ layer 1 g + 9 g water. $2^{nd}$ layer 15 g PPP/L350 slurry |
| 17 | A91 | $1^{st}$ layer 1 g + 4 g water. $2^{nd}$ layer 15 g PPP/L350 slurry |
| 18 | L350 | $1^{st}$ layer 1 g + 4 g water. $2^{nd}$ layer 15 g PPP/L350 slurry |
| 19 | L350 | $1^{st}$ layer 15 g PPP/L350 slurry. $2^{nd}$ layer 1 g L350 + 4 g water |
| 20 | L350 | $1^{st}$ layer 11 g PPP/slurry. $2^{nd}$ layer 1.83 g L350 + 3.17 g water |
| 21 | A93 | $1^{st}$ layer 1 g + 4 g water. $2^{nd}$ layer 15 g PPP/L350 slurry |
| 22 | A95 | $1^{st}$ layer 1 g + 4 g water. $2^{nd}$ layer 15 g PPP/L350 slurry |
| 23 | A92 | $1^{st}$ layer 1 g + 4 g water. $2^{nd}$ layer 15 g PPP/L350 slurry |
| 24 | A94 | $1^{st}$ layer 1 g + 4 g water. $2^{nd}$ layer 15 g PPP/L350 slurry |
| 25 | L800 | $1^{st}$ layer 1 g + 4 g water. $2^{nd}$ layer 15 g PPP/L350 slurry |
| 26 | A08 | $1^{st}$ layer 1 g + 4 g water. $2^{nd}$ layer 15 g PPP/L350 slurry |
| 27 | A09 | $1^{st}$ layer 1 g + 4 g water. $2^{nd}$ layer 15 g PPP/L350 slurry |
| 28 | A91 | One layer 1 g + 4 g water + 15 g PPP/L350 slurry |

$^{(1)}$ PPP slurry without L350: 1.05 g Maxim + 7.34 g Cruiser + 2.61 g water, total 11 g.

TABLE 4

Wear test results (resistance 0: perfect, 5: very poor)

| | Primer | Test direct after coating | | Test 3 weeks after coating | |
|---|---|---|---|---|---|
| | | Wear Test duration | | | |
| Exp. # | Formulation | 10 min | 20 min | 10 min | 20 min |
| 11 | — | 3.0 | 4.5 | 3.0 | 4.0 |
| 12 | — | 2.0 | 3.0 | 2.0 | 2.5 |
| 13 | A91 | 0.5 | 0.5 | 0.5 | 0.5 |
| 14 | A91 | 2.0 | 3.0 | 2.5 | 3.5 |
| 15 | A91 | 0.5 | 0.5 | 1.5 | 2.5 |
| 16 | A91 | 0.2 | 0.3 | 0.4 | 0.5 |
| 17 | A91 | 0.5 | 0.5 | 0.5 | 1.0 |
| 18 | D327 | 0.3 | 0.4 | 0.5 | 1.0 |
| 19 | D327 | 0.3 | 0.4 | 0.5 | 1.0 |
| 20 | D327 | 2.5 | 3.5 | 2.0 | 2.5 |
| 21 | A93 | 0.5 | 0.7 | 1.0 | 1.5 |
| 22 | A95 | 0.5 | 1.0 | 1.0 | 1.5 |
| 23 | A92 | 0.5 | 0.7 | 1.0 | 1.5 |
| 24 | A94 | 1.0 | 1.5 | 1.0 | 1.5 |
| 25 | L800 | 0.5 | 1.0 | 1.0 | 1.5 |
| 26 | A08 | 0.4 | 0.5 | 0.8 | 1.0 |
| 27 | A09 | 0.7 | 1.0 | 1.0 | 1.7 |
| 28 | A91 | 0.5 | 1.0 | 1.0 | 1.8 |

Wear test results are given in table 4. Surprisingly, it was found that it was not needed to dry the seeds with the primer before applying the slurry cocktail. In fact, application of the slurry a few seconds after the primer yields the best results for rubbing-off resistance. The primer has a positive effect on the wear resistance. Formulations with a PVC of 38 perform slightly better than primers with cPVC. The blending process was however easier with the cPVC formulations.

It was observed that primers A91, A93 and A08 provided good wear results. For all primer formulations, coating the seeds with 1 g primer formulation with 4 g of water to give a primer layer followed by coating with the slurry cocktail provides improved wear resistance compared to the reference without primer layer. Experiments 18, 19 and 25 show that the existing film coating formulations L350 and L800 can also be used as primer layer with good results. In practice, these are however more expensive. Remarkably, the wear test results after three weeks are somewhat less good than directly after coating. Without primer layer, the results after three weeks are typically better than the directly after coating. The method of coating with subsequent addition of the primer and the slurry (experiment 17) gives better results than simultaneous coating (experiment 28). Sticking PPP (plant protection products) directly to the primer layer, without film coat, does not give good results (experiment 14). Best results are obtained when not too much primer is applied. Best results are obtained when the primer is applied a few second before applying the slurry.

Example 8

Film coating formulations were prepared with different types of binders, see table 5. The film coating composition comprised 25 wt. % polymer (expressed as dry polymer content), and other components including water, effect pigment, biocides, defoamer and rheology additive. A PPP cocktail was used of 17 wt. % Langis and 10 wt. % Maxim and 15 wt. % Raxil and water, total 100 wt. %. This PPP cocktail was used in each of examples 8-13. Table 6 shows the drying results for coating of corn seed with a slurry consisting of 10 wt. % the film coating composition, 42 wt. % PPP cocktail and water up to 100 wt. %. Table 7 shows the drying results for coating of corn seed corresponding to 25 wt. % film coat, however this was achieved by using the same amount of a film coat having a 2.5 times higher binder content. Slurry was applied in amount of 10 g/kg seed. In tables 6 and 7, phase 1 is "set to touch", phase 2 is "dust free", phase 3 is "dry to touch", phase 4 is "dry hard" and phase 5 is "dry through" in ASTM D1640. A short time to achieve phase 5 indicates a desirable fast and complete drying. Table 6 shows that these binders accelerate the drying process. Remarkably, cracks were absent in the resulting film, suggesting that components of the PPP cocktail may act as coalescing agent. However, complete drying to phase 5 was not achieved. Table 7 shows that in particular binders A, C, D and F enabled a complete drying process. Remarkably, the coatings advantageously had low number of craters and Benard cells.

Figure 5:
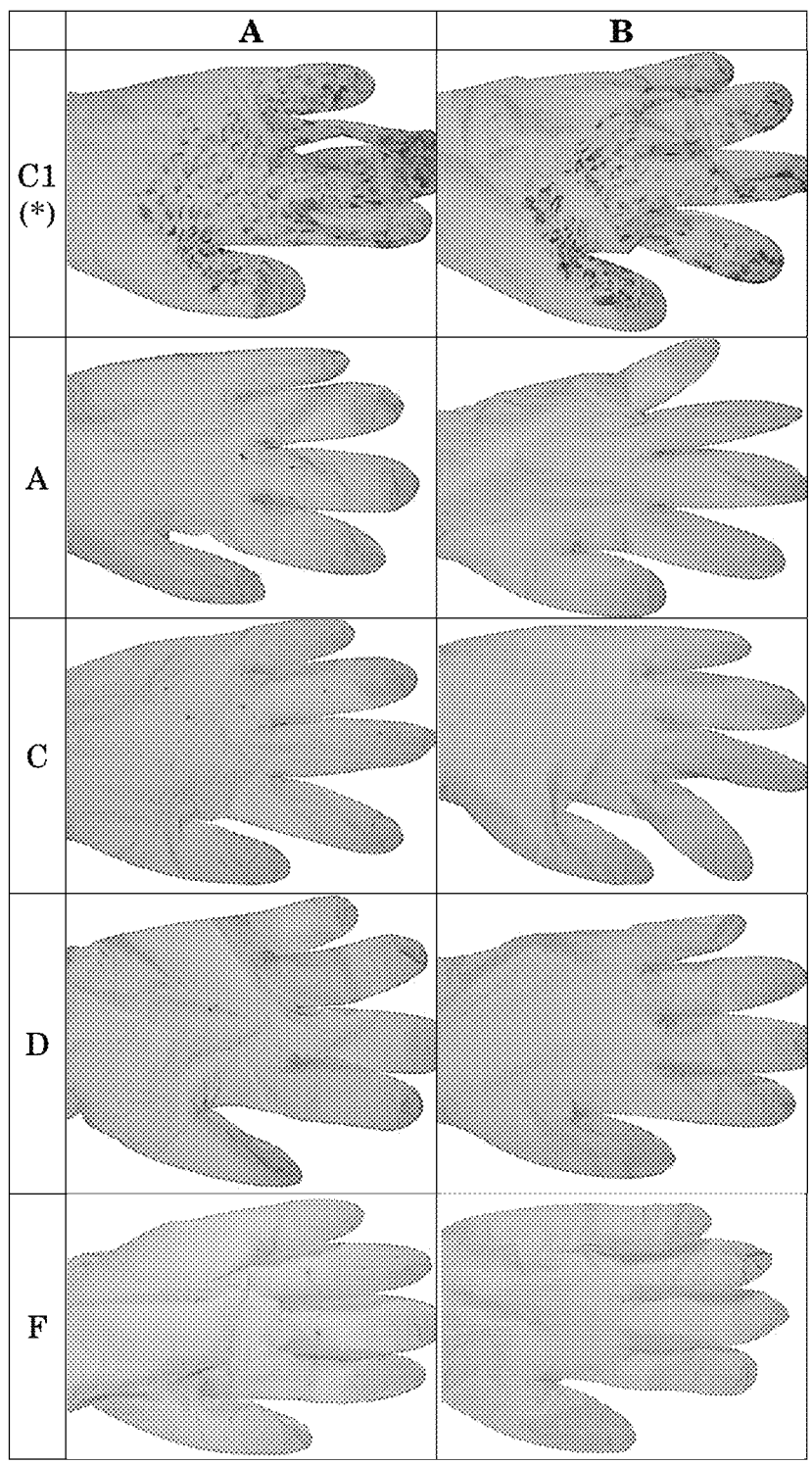
FIG. 5 shows the results of a comparative rubbing-off test for coated corn.

FIG. 5 shows the results of a rubbing-off test, for corn coated with slurries comprising Langis® and 25 wt. % film coating compositions as used for table 7. C1 is a comparative sample with 10 wt. % film coating comprising polyvinylalcohol (PVOH) as binder such that the slurry comprise 0.15 wt. % of PVOH, based on dry polymer. The PVOH has a $T_g$ of about 85° C. but was water soluble. Column A shows rubbing-off on a glove directly after coating, column B shows rubbing-off 24 hours after coating.

Wear resistance was tested by subjecting coated seed to 20 minutes of abrasion. Good wear resistance was observed when coated seeds with A, C, D and F were subjected to a wear test 3 weeks after coating (20 minutes abrasion). For binders A, C, D and F, wear resistance was higher 3 weeks after coating than directly after coating.

TABLE 5

| | Description | Solids (wt. %) | $T_g$ (° C.) | MFFT (° C.) |
|---|---|---|---|---|
| A | aqueous emulsion of an acrylic copolymer | 30 | 65 | 65 |
| B | rheology controlled acrylic emulsion | 43 | 78 | >60 |
| C | non-plasticised aqueous copolymer dispersion based on acrylic and methacrylic acid esters | 46 | 98 | 90 |
| D | aqueous emulsion of an acrylic styrene copolymer | 45 | 99 | >90 |

TABLE 5-continued

| | Description | Solids (wt. %) | $T_g$ (° C.) | MFFT (° C.) |
|---|---|---|---|---|
| E | hard, anionic, methacrylic copolymer emulsion | 40 | 108 | >100 |
| F | styrene acrylic emulsion | 44 | 110 | >85 |

TABLE 6 drying times (hh:mm) for 10 wt. % film coat for binders A-F

| | Binder | | | | | |
|---|---|---|---|---|---|---|
| Phase | A | B | C | D | E | F |
| 1 | 0:09:00 | 0:35:00 | 0:14:00 | 0:12:00 | 2:40:00 | 0:08:00 |
| 2 | 4:00:00 | 6:00:00 | 4:00:00 | 4:00:00 | 3:00:00 | 0:50:00 |
| 3 | 18:00:00 | 18:00:00 | 18:00:00 | 18:00:00 | | 5:00:00 |
| 4 | | | | | | |
| 5 | | | | | | |

TABLE 7 drying times (hh:mm) for 25 wt. % film coat for binders A-F

| | Binder | | | | | |
|---|---|---|---|---|---|---|
| Phase | A | B | C | D | E | F |
| 1 | 0:09:00 | 0:11:30 | 0:08:30 | 0:11:00 | 0:07:30 | 0:07:30 |
| 2 | 0:11:00 | 2:00:00 | 0:08:30 | 0:13:00 | 0:08:00 | 0:25:00 |
| 3 | 0:45:00 | 18:00:00 | 0:30:00 | 1:00:00 | 4:00:00 | 0:32:00 |
| 4 | 4:30:00 | | 3:30:00 | 16:30:00 | 18:00:00 | 0:55:00 |
| 5 | 18:00:00 | | 18:00:00 | 18:00:00 | | 18:00:00 |

Example 9

Rubbing-off and wear resistance were tested for slurries with various amounts of binder C: 2.5 wt. % (C1), 3.75 wt. % (C2), 5.0 wt. % (C3), 6.25 wt. % (C4), all amounts as dry polymer based on total slurry. Hence, these amounts are based on dry polymer in the wet slurry as applied, as for examples 10-13. Rubbing-off directly after coating decreased with increasing amount of binder and was very low for C4, rubbing of at 24 hours after coating was very low for all coatings. Wear resistance directly after coating was high for C1 and low for C2, C3 and C4; in contrast wear resistance at 3 weeks after coating was low for C1 and improved with higher content of C, hence was best for C4.

Example 10

In order to improve the wear resistance of the coated corn seeds compared to example 9, corn seed was coated with a slurry with a combination of binder C with binder G, a styrene acrylic copolymer with $T_g$ of −4° C. The amount of binders C and G together was 2.5 wt. % in the total slurry, corresponding to 10 wt. % film coating composition in the slurry. With a weight ratio of binder C to binder G of 60:40, improved wear resistance at 3 weeks after coating was obtained.

With 6.25 wt. % binder C and G together, the coated corn seed did not rub-off at 24 hours after coating, which is very good, for a weight ratio 60:40 and 80:20. Wear resistance directly after coating was very good. Wear resistance at 3 weeks after coating was acceptable.

Example 11

In order to improve wear resistance at 3 weeks after coating, four samples of corn seed were coated with a slurry comprising 6.25 wt. % binder C, with 2.0 wt. % or 4.0 wt. % of wax 1 an oxidised polyethylene wax or wax 2 a modified polyethylene wax. This provided a much higher wear resistance at 3 weeks after coating. Best wear resistance at 3 weeks after coating was obtained with wax 1.

Example 12

Combinations of a primer layer and a slurry with either binder C or binder F were evaluated. With 6.25 wt. % binder C or binder F, improved wear resistance directly after coating was observed compared to coated corn seed without a primer layer. With 2.5 wt. % binder C, slightly improved wear resistance at 3 weeks after coating was obtained. Rubbing-off was not affected by the presence of primer. Primer A91 of example 7 was used.

Example 13

Figure 6:
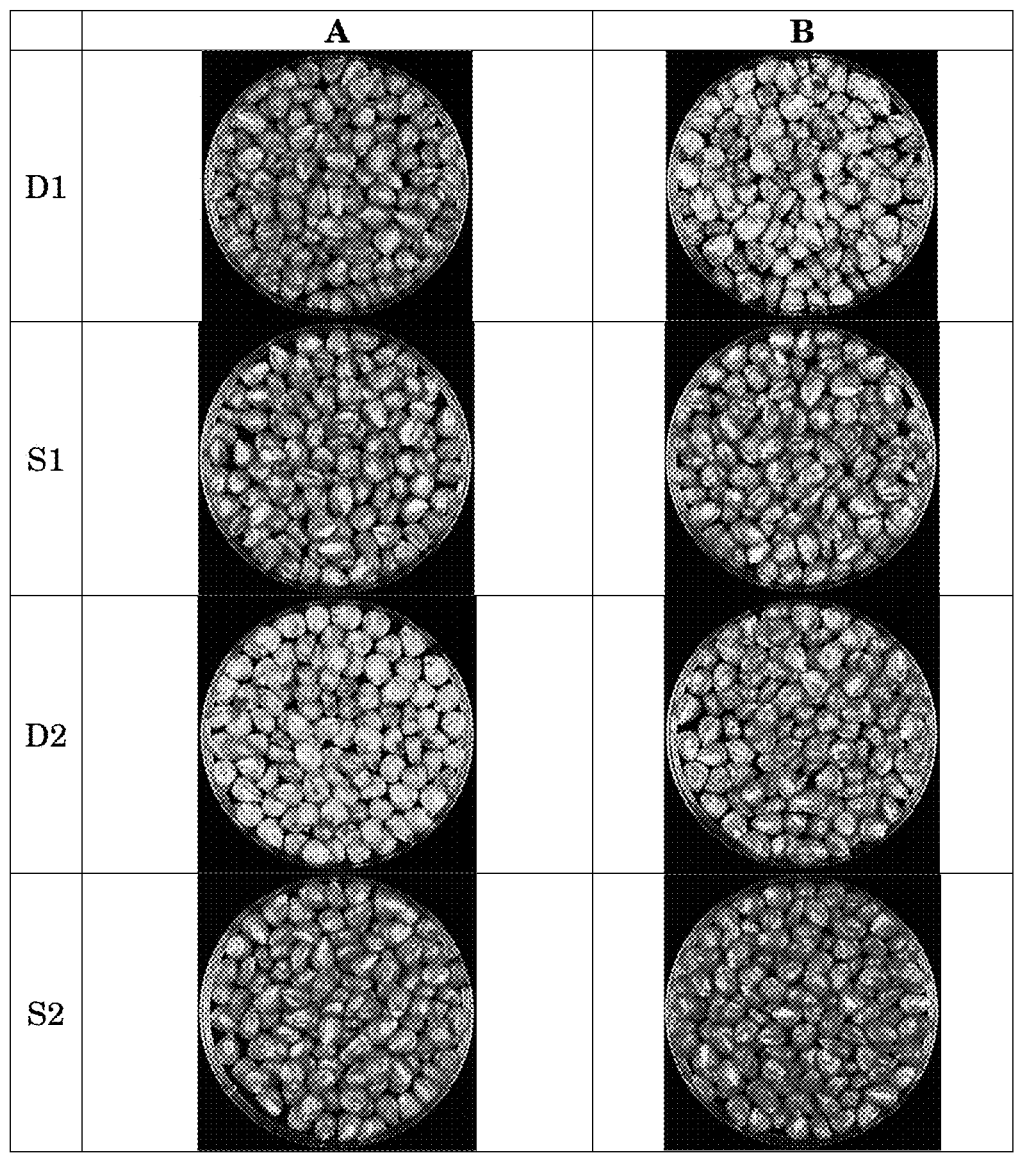
FIG. 6 shows the results for a wear test of coated corn directly after coating (column A) and for wear testing at three weeks after coating (column B).

The combination of a surface treatment of corn seed by roughening and a coating with binder C was tested. FIG. 6 shows the results for a wear test of coated corn seed directly after coating (column A) and for wear testing at three weeks after coating (column B). Light colours indicate that coating material has been locally removed, whether or not involving release of coating material from the coated seed. The coating had a red colour, darker than the corn seed. Uniform dark colour indicates good wear resistance. D1 is obtained with 2.5 wt. % binder D slurry and D2 with a 6.25 wt. % binder D slurry, each without prior surface treatment. S1 and S2 are obtained with the same slurries but with the surface treatment. Wear resistance after 3 weeks was tremendously improved for S1 compared to D1 and was improved for S2 compared to D2. Wear resistance directly after coating was tremendously improved for S2 compared to D2. This suggest 3 to 4.5 wt. % binder can give further improvement. Wear was tested by 20 minutes sanding with P60.

Example 14

Film coating formulations were prepared according to table 8. For A and B, a different base formulation was used, each comprising water, colorant, filler, and wax additive. Binders F and G were used, as in example 10. A PPP cocktail was used consisting of 32.4 wt. % Cruiser 26.9 wt. % Maxim and 40.5 wt. % Raxil. Corn seed was coated with a slurry of 37 wt. % PPP cocktail, 20 wt. % film coating formulations and 43.5 wt % water; the application rate being 10 g/kg seeds, such that 2 g film coating formulation per kg seed was applied. In this Example, binder content is expressed in terms of wet binder wt. %, including solvent in the used binder product.

Drying of the coating was tested. The results as given in table 8 show that quick drying is obtained with binder F. The results for composition C indicate that 4 g film formulation per kg seed, with 50 wt. % binder, based on film formulation, would provide for fast drying and high hardness. Drying phases are the same as for Example 8.

TABLE 8 drying times with combinations of binders

| Film coating composition | Binder F (wt. %) | Binder G (wt. %) | Base (wt. %) | Phase 1 (min) | Phase 3 (min) | Phase 4 (min) | Phase 5 (min) |
|---|---|---|---|---|---|---|---|
| A | 50 | 0 | 50 | 6 | 6 | 15 | 40 |
| B | 40 | 10 | 50 | 7 | 10 | 13 | >24 h |
| C | 100 | 0 | 0 | 14 | 15 | 18 | 25 |

Example 15

Mixtures of coating formulations as shown in table 9 were applied to corn seed, in combination with 35.83 wt % water, and 30.83 wt % of a PPP cocktail and 33.33 wt. % film coating formulations. The PPP cocktail consisted of 32.4 wt. % Cruiser 26.9 wt. % Maxim and 40.5 wt. % Raxil. For each of compositions 1-5, a different base formulation was used each comprising water, colorant, filler, and wax additive.

Wear resistance was tested as follows: an amount freshly coated seeds was placed in a carousel and was continuously turned for 20 min; 10 min thereafter, a sample was taken. This test was repeated after three weeks with non tested seeds of the same coatings batch. During this test, the seed coating endures mechanical stress, similar to those in seed coating equipment. Test results are given in table 9.

TABLE 9

Wear resistance results

| Dose | | | Wear Resistance (b) | | |
|---|---|---|---|---|---|
| | (c) | Formulation (wt. %) | 10 min | 20 min | 3 weeks |
| 1(a) | 4 g | Commercial film coating | 2.9 | 4.5 | 1.5 |
| 2 | 4 g | Base + 50 wt. % binder F | 1.8 | 2.7 | 2 |
| 3 | 4 g | Base + 50 wt. % binder F | — | 2.3 | 2.8 |
| 4 | 4 g | Base + 25 wt. % binder G + 25 wt. % binder F | — | 0.5 | 0.4 |
| 5 | 4 g | Base + 30 wt. % binder G + 20 wt. % binder F | — | 0.6 | 0.8 |

Figure 7:
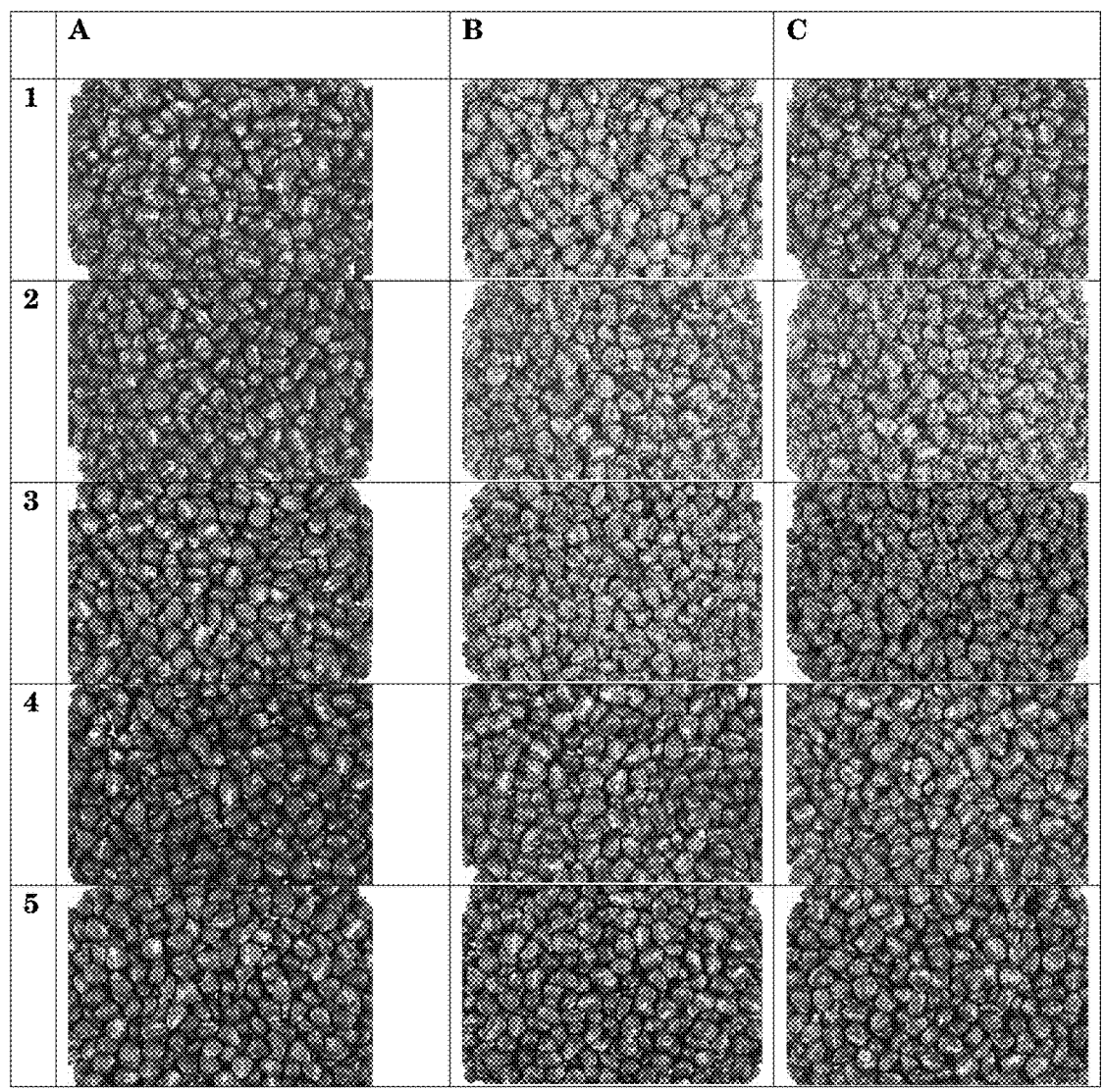
FIG. 7 shows coated corn seed not subjected to a wear test (column A), coated corn seed subjected to a wear test carried out directly after coating (column B), and coated corn seed subjected to a wear test carried out 3 weeks after coating (column C).

(a)comparative
(b): 0 is good to 5 is bad; at time (10 min, 20 min, 3 weeks) after applying coating;
(c): formulation per kg seed Compared to comparative composition 1, some improvement of the wear resistance can be seen in table 9 for compositions 2 and 3, but wear resistance is moderate. Combination of binder F and G in a 1:1 weight ratio provided further improvement (composition 4). A weight ratio of about 1:1 appears to give best results (compositions 4 and 5). FIG. 7 shows the seed according to compositions 1-5 of table 9, with in column A coated corn seed not subjected to a wear test, in column B the seed after a wear test carried out directly after coating, and in column C coated seed after a wear test carried out 3 weeks after coating, in each case the wear test involved 20 minutes abrasion. Uniform dark colour indicates better wear resistance.

Some non-limiting embodiments of aspects of the invention include:

Embodiment 1. Seed coating composition comprising one or more water-insoluble polymers with a $T_g$ of at least 35° C.

Embodiment 2. Seed coating composition according to embodiment 2, wherein said one or more water-insoluble polymers have a $T_g$ of at least 60° C.

Embodiment 3. Seed coating composition according to embodiment 1 or 2, wherein at least one of said one or more water-insoluble polymers with a $T_g$ of at least 35° C. is an acrylic polymer.

Embodiment 4. Seed coating composition according to embodiment 3, wherein said acrylic polymer is a styrene acrylic copolymer with a $T_g$ of at least 35° C.

Embodiment 5. Seed coating composition according to any one of embodiments 1-4, comprising at least 2.0 wt. % water-insoluble polymers with a $T_g$ of at least 35° C., more preferably at least 5.0 wt. %, based on total weight of the seed coating composition.

Embodiment 6. Seed coating composition according to any one of embodiments 1-5, further comprising one or more additional polymers with a $T_g$ of less than 30° C.

Embodiment 7. Seed coating composition according to embodiment 6, wherein said one or more additional polymers have a $T_g$ of less than 10° C.

Embodiment 8. Seed coating composition according to embodiment 6 or 7, wherein said one or more water-insoluble polymers have a $T_g$ of at least a temperature T1 and wherein said one or more additional polymers have a $T_g$ of less than a temperature T2, wherein T1 is at least 10° C. higher than T2, more preferably at least 20° C. or at least 40° C.

Embodiment 9. Seed coating composition according to any one of embodiments 6-8, having a weight ratio of water-insoluble polymers with $T_g$ of at least 35° C. to additional polymers with a $T_g$ of less than 30° C. in the range of 10:1 to 1:5, preferably in the range of 5:1 to 1:2.

Embodiment 10. Seed coating composition according to any one of embodiments 6-9, wherein said one or more additional polymers include an acrylic polymer with a $T_g$ of less than 30° C.

Embodiment 11. Seed coating composition according to embodiment 10, comprising one or more water-insoluble acrylic polymers with a $T_g$ of at least 60° C. and one or more additional acrylic polymers with a $T_g$ of less than 10° C.

Embodiment 12. Seed coating composition according to any one of embodiments 1-11, comprising an aqueous dispersion of at least part of the one or more water-insoluble polymers with $T_g$ of at least 35° C.

Embodiment 13. Seed coating composition according to any one of embodiments 1-12, further comprising one or more or each selected from the group consisting of a wetting and dispersing additive, a filler, a solvent and/or a diluent, a thickener, a colorant, an anti-foaming agent, a preservative, a surfactant, a wax, a flow agent, and an effect pigment.

Embodiment 14. Seed coating composition according to embodiment 13 or 14, comprising wax and preferably having a weight ratio of wax to water-insoluble polymers with $T_g$ of at least 35° C. in the range of 1:50 to 1:1.

The invention claimed is:

1. A method for increasing the wear resistance of coated plant seed, comprising applying to the seed a seed coating composition comprising:
    one or more water-insoluble polymers with a $T_g$ of at least 70° C. comprising a copolymer of styrene and;
    one or more additional polymers with a $T_g$ of less than 10° C. comprising a copolymer of an acrylic acid ester and a methacrylic acid ester;
    a binder comprising a styrene acrylic copolymer;
    a polyethylene wax with formula $(CH_2)_nH_2$, where n ranges between 50 and 100, where a weight ratio of the wax to the one or more water-insoluble polymers is in a range of 1:20 to 1:1; and
    an organic solvent present in a weight ratio to the one or more water-insoluble polymers of 1:100 to 2:1,
    wherein the one or more water insoluble polymers is present in a ratio with the one or more additional polymers of 5:1 to 1:2,
    wherein the one or more water-insoluble polymers is at least partly present as dispersion in the coating composition,
    wherein when the seed is subjected to surface treatment with P60 commercial sanding paper for 20 minutes both prior to application of the seed coating composition and again 3 weeks afterward, the seed is significantly more wear resistant compared to identical seed not subjected to the surface treatment prior to application of the seed coating composition.

2. The method according to claim 1, wherein the seed coating composition further comprises one or more additional acrylic polymers with a $T_g$ of less than 30° C.

3. The method according to claim 1, wherein the one or more water-insoluble polymers have a $T_g$ of at least 90° C.

4. The method according to claim 1, wherein the method comprises combining the seed coating composition with a liquid based formulation comprising a plant enhancing agent and one or more selected from the group consisting of a non-aqueous solvent, a surfactant and an anti-freeze agent.

5. The method according to claim 1, wherein the coating composition is applied to the seed at a temperature at a temperature in the range of −5° C. to 35° C.

6. The method according to claim 1, where the organic solvent is selected from ethylene glycol, propylene glycols and their esters and ethers containing $C_1$-$C_6$ alkyl groups.

* * * * *

UNITED STATES PATENT AND TRADEMARK OFFICE
CERTIFICATE OF CORRECTION

| | |
|---|---|
| PATENT NO. | : 12,022,761 B2 |
| APPLICATION NO. | : 15/318897 |
| DATED | : July 2, 2024 |
| INVENTOR(S) | : Henricus Antonius Maria Reus et al. |

It is certified that error appears in the above-identified patent and that said Letters Patent is hereby corrected as shown below:

In the Claims

Claim 5 at Column 36, Lines 23-24: delete "at a temperature at a temperature" and insert -- at a temperature --.

Signed and Sealed this
Seventeenth Day of September, 2024

Katherine Kelly Vidal
*Director of the United States Patent and Trademark Office*